(12) United States Patent
Abiru

(10) Patent No.: US 11,647,128 B2
(45) Date of Patent: May 9, 2023

(54) MANAGEMENT APPARATUS, MANAGEMENT SYSTEM, AND RECORDING MEDIUM

(71) Applicant: Hiroyuki Abiru, Kanagawa (JP)

(72) Inventor: Hiroyuki Abiru, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/475,349

(22) Filed: Sep. 15, 2021

(65) Prior Publication Data
US 2022/0103703 A1 Mar. 31, 2022

(30) Foreign Application Priority Data

Sep. 25, 2020 (JP) .............................. JP2020-161433

(51) Int. Cl.
*H04N 1/00* (2006.01)
*H04N 1/32* (2006.01)

(52) U.S. Cl.
CPC ..... *H04N 1/00344* (2013.01); *H04N 1/00206* (2013.01); *H04N 1/00244* (2013.01); *H04N 1/00408* (2013.01)

(58) Field of Classification Search
None
See application file for complete search history.

(56) References Cited

U.S. PATENT DOCUMENTS

| 5,644,404 | A | 7/1997 | Hashimoto et al. |
| 2001/0040697 | A1 | 11/2001 | Wu et al. |
| 2018/0082067 | A1* | 3/2018 | Yamaguchi ........... G06F 21/602 |

FOREIGN PATENT DOCUMENTS

| JP | 2002171378 | * | 6/2002 | ............... H04N 1/00 |
| JP | 2006287448 | * | 10/2006 | ............... H04N 1/00 |
| JP | 2006311184 | * | 11/2006 | ............... H04N 1/00 |
| JP | 2008033409 | * | 2/2008 | ............... G06F 21/88 |
| JP | 2008092475 | * | 4/2008 | ............... H04N 1/00 |
| JP | 2009-514480 | | 4/2009 | |
| JP | 2013-191970 | | 9/2013 | |
| JP | 2013174949 | * | 9/2013 | ............... G06F 12/00 |
| JP | 2013 201625 | | 10/2013 | |
| JP | 2015204524 | * | 11/2015 | ............... H04N 1/00 |
| JP | 2015210768 | * | 11/2015 | ............... H04N 1/00 |
| JP | 2015211427 | * | 11/2015 | ............... H04N 1/00 |

(Continued)

OTHER PUBLICATIONS

C. Huang, C. Wen and K. Chang, "Web-based fax server for home or small business use," in IEEE Transactions on Consumer Electronics, vol. 53, No. 3, pp. 819-824, Aug. 2007, doi: 10.1109/TCE.2007.4341551. (Year: 2007).*

(Continued)

*Primary Examiner* — Beniyam Menberu
(74) *Attorney, Agent, or Firm* — Xsensus LLP

(57) ABSTRACT

A management apparatus includes circuitry that stores, in a memory, facsimile data received by an electronic device in association with information on a group to which the received facsimile data belongs, and transmits a list of the received facsimile data based on a browse request of the received facsimile data. In the list, the received facsimile data is classified according to at least the information on the group to which the electronic device belongs.

11 Claims, 23 Drawing Sheets

(56) References Cited

FOREIGN PATENT DOCUMENTS

| JP | 2015211428 | * | 11/2015 | ............... | H04N 1/00 |
| JP | 2018042067 | * | 3/2018 | ............... | H04N 1/00 |
| JP | 2018-088286 | | 8/2018 | | |
| WO | WO2007/066850 A1 | | 8/2007 | | |

OTHER PUBLICATIONS

C. -h. Huang, C. Wen and K. -c. Chang, "Web-based fax server for home or small business use," in IEEE Transactions on Consumer Electronics, vol. 53, No. 3, pp. 819-824, Aug. 2007, doi: 10.1109/TCE.2007.4341551. (Year: 2007).*
Extended European Search Report dated Nov. 5, 2021 in European Patent Application No. 21196384.8, 9 pages.

* cited by examiner

FIG. 10A

| RECEIVER NUMBER (TERMINAL IDENTIFICATION INFORMATION) | RECEIVER SITE |
|---|---|
| 03-xxxx-0001 | SITE A |
| 03-xxxx-0002 | SITE A |
| 06-xxxx-0003 | SITE B |
| 06-xxxx-0004 | SITE B |
| 06-xxxx-0005 | SITE C |
| 06-xxxx-0006 | SITE C |

FIG. 10B

| SENDER NUMBER | BUSINESS PARTNER |
|---|---|
| 03-xxxx-1001 | COMPANY X |
| 045-xxxx-1002 | COMPANY Y |
| 045-xxxx-1003 | COMPANY Y |
|  |  |

| GLOBAL IP ADDRESS | RECEIVER SITE |
|---|---|
| xx.xxx.xxx.01 | SITE A |
| xx.xxx.xxx.02 | SITE B |
| xx.xxx.xxx.03 | SITE B |
| xx.xxx.xxx.04 | SITE C |
| xx.xxx.xxx.04 | SITE C |

FIG. 14

| RECEIVER NUMBER | RECEIVER SITE | SENDER NUMBER | SENDER | RECEPTION DATE AND TIME | RECEIVED DATA STORAGE LOCATION |
|---|---|---|---|---|---|
| 03-xxxx-0001 | SITE A | 03-xxxx-1001 | COMPANY X | 2020/05/22 | \<path\>/020052209000123.pdf |
| 06-xxxx-0005 | SITE C | 045-xxxx-1002 | COMPANY Y | 2020/05/22 | \<path\>/2020052210050545 6.pdf |
| | | | | | |
| | | | | | |
| | | | | | |

FIG. 17
| RECEIVER NUMBER | RECEIVER MACHINE | RECEIVER SITE |
|---|---|---|
| 03-xxxx-0001 | 0001 | SITE A |
| 03-xxxx-0002 | 0002 | SITE A |
| 06-xxxx-0003 | 0003 | SITE B |
| 06-xxxx-0004 | 0003 | SITE B |
| 06-xxxx-0005 | 0004 | SITE C |
| 06-xxxx-0006 | 0005 | SITE C |
FIG. 18A
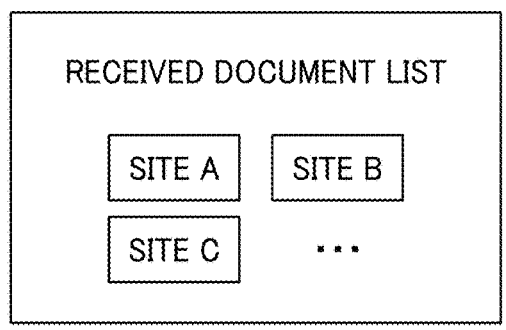
FIG. 18B
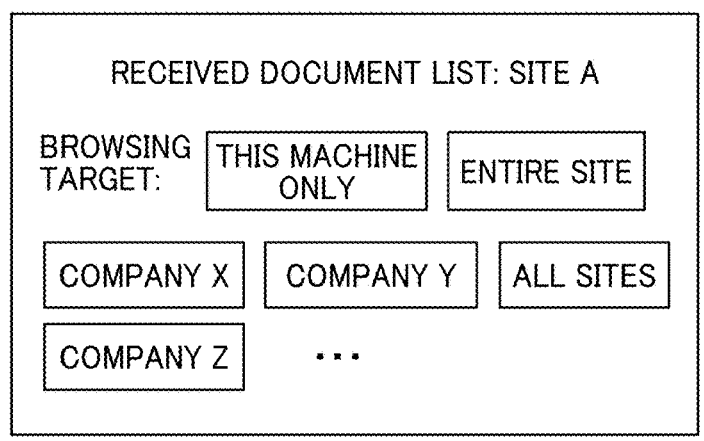

| USER ID | SITE (GROUP) |
|---------|--------------|
| User01  | SITE A       |
| User02  | SITE B       |
|         |              |

| USER ID | BUSINESS PARTNER |
|---------|------------------|
| User01  | COMPANY X        |
| User02  | COMPANY Y        |
|         |                  |

FIG. 21A

RECEIVED FACSIMILE DATA

USER: user1

| RECEIVER NUMBER | SENDER | SITE | MACHINE |
|---|---|---|---|
| RECEIVER NUMBER 1 | XXX | A | MFP1 |
| RECEIVER NUMBER 2 | XXX | A | MFP1 |
| RECEIVER NUMBER 5 | XXX | B | MFP3 |

FIG. 21B

RECEIVED FACSIMILE DATA

USER: user2

| RECEIVER NUMBER | SENDER | SITE | MACHINE |
|---|---|---|---|
| RECEIVER NUMBER 1 | YYY | A | MFP2 |

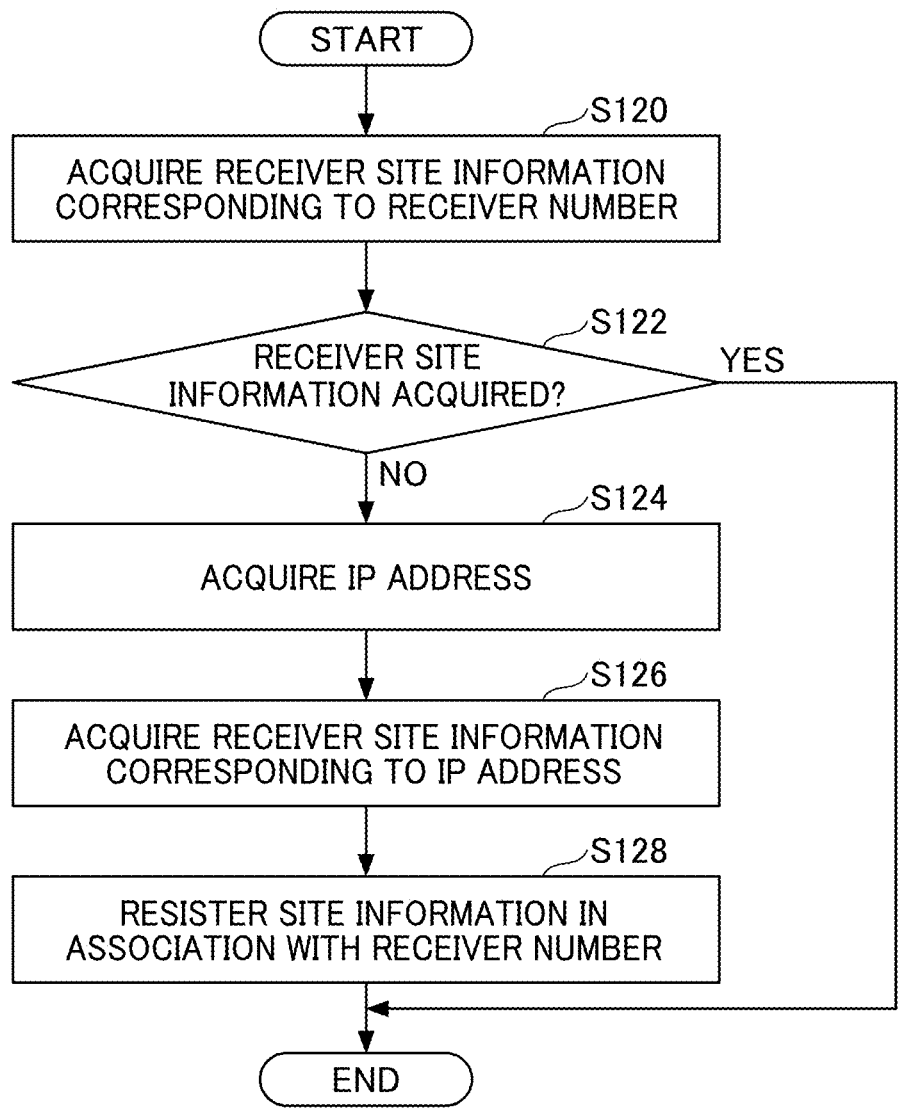

FIG. 23

| RECEIVER NUMBER (TERMINAL IDENTIFICATION INFORMATION) | RECEIVER SITE |
|---|---|
| 03-xxxx-0001 | SITE A |
| 03-xxxx-0002 | SITE A |
| 06-xxxx-0003 | SITE B |
| 06-xxxx-0004 | SITE B |
| 06-xxxx-0005 | SITE C |
| 06-xxxx-0006 | SITE C |
| 03-xxxx-0007 | SITE A |

FIG. 25

```
           SITE SETTING
    FACSIMILE MACHINE: 03-xxxx-0001

GROUP BY:                    GROUP
┌─────────────┐          ┌─────────────┐
│ ▼  SITE     │          │ ▼  DEPT. A  │
│    DEPT.    │          │    DEPT. B  │
│    BUSINESS │          │    DEPT. C  │
└─────────────┘          └─────────────┘

[CREATE NEW]          [CANCEL]  [OK]
```

FIG. 26

| RECEIVER NUMBER (TERMINAL IDENTIFICATION INFORMATION) | RECEIVER GROUP |
|---|---|
| 03-xxxx-0001 | SITE A, DEPT. B |
| 03-xxxx-0002 | SITE A, DEPT. A |
| 06-xxxx-0003 | SITE B, DEPT. B |
| 06-xxxx-0004 | SITE B, DEPT. A |
| 06-xxxx-0005 | SITE C, DEPT. A |
| 06-xxxx-0006 | SITE C, DEPT. B |

# MANAGEMENT APPARATUS, MANAGEMENT SYSTEM, AND RECORDING MEDIUM

CROSS-REFERENCE TO RELATED APPLICATION

This patent application is based on and claims priority pursuant to 35 U.S.C. § 119(a) to Japanese Patent Application No. 2020-161433, filed on Sep. 25, 2020, in the Japan Patent Office, the entire disclosure of which is hereby incorporated by reference herein.

BACKGROUND

Technical Field

Embodiments of the present disclosure relate to an apparatus and a system that manages facsimile data, a method for managing facsimile data, and a recording medium storing a program for managing facsimile data.

Related Art

There are facsimile transfer systems for improving the efficiency of digitizing and storing received facsimile documents in a file server. Such a system automatically digitizes and stores facsimile documents in the file server in accordance with an attribute of the facsimile document. Such a system creates a file having a name according to attribute information, such as the telephone number of the sender of a facsimile document, and stores the facsimile document in a file server.

For an information processing system including a multifunction peripheral (MFP) and a file server capable of storing files, there is a related art for processing facsimile document transfer setting, facsimile reception, and file transfer accompanying the facsimile reception.

SUMMARY

An embodiment of the present disclosure provides a management apparatus that includes circuitry that stores, in a memory, facsimile data received by an electronic device in association with information on a group to which a destination of the received facsimile data belongs, and transmits a list of the received facsimile data based on a browse request of the received facsimile data. In the list, the received facsimile data is classified according to at least the information on the group to which the destination belongs.

Another embodiment of the present disclosure provides a management system that include the above-described management apparatus and a plurality of electronic devices connected via a network to the management apparatus, to perform data communication. Each of the plurality of electronic devices includes circuitry that transmits and receives facsimile data, and transfers the received facsimile data to the management apparatus.

Another embodiment of the present disclosure provides a non-transitory recording medium storing a plurality of program codes which, when executed by one or more processors, causes the processors to perform a method. The method includes storing, in a memory, the received facsimile data in association with information on a group to which a destination of the received facsimile data belongs. The method further includes transmitting a list of the received facsimile data based on a browse request of the received facsimile data. In the list, the received facsimile data is classified according to at least the information on the group to which the destination belongs.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 10A and 10B are tables as examples of information stored in a management information storage area illustrated in FIG. 4;

FIG. 14 is a table illustrating an example of a management table created by the management system illustrated in FIG. 4;

FIG. 17 is a table illustrating an example of information stored in a management information storage area according to the variation illustrated in FIG. 16;

FIGS. 18A and 18B illustrate examples of screens on the facsimile machine on the site according to the variation illustrated in FIG. 16;

FIGS. 21A and 21B are examples of display of the received facsimile data list on the facsimile machine and the PC on the site according to the variation illustrated in FIGS. 19A and 19B;

FIG. 22 is a flowchart of an example of a process of automatically registering a facsimile machine, executed by a management system according to another variation;

FIG. 23 is an example of a table associating a receiver number with receiver site information, including the receiver number of a facsimile machine newly introduced to the receiver site;

FIG. 25 is a diagram illustrating an example of a setting screen for selecting a grouping item;

FIG. 26 is a table illustrating an example of information stored in a management information storage area in a case illustrated in FIG. 25.

Figure 1:
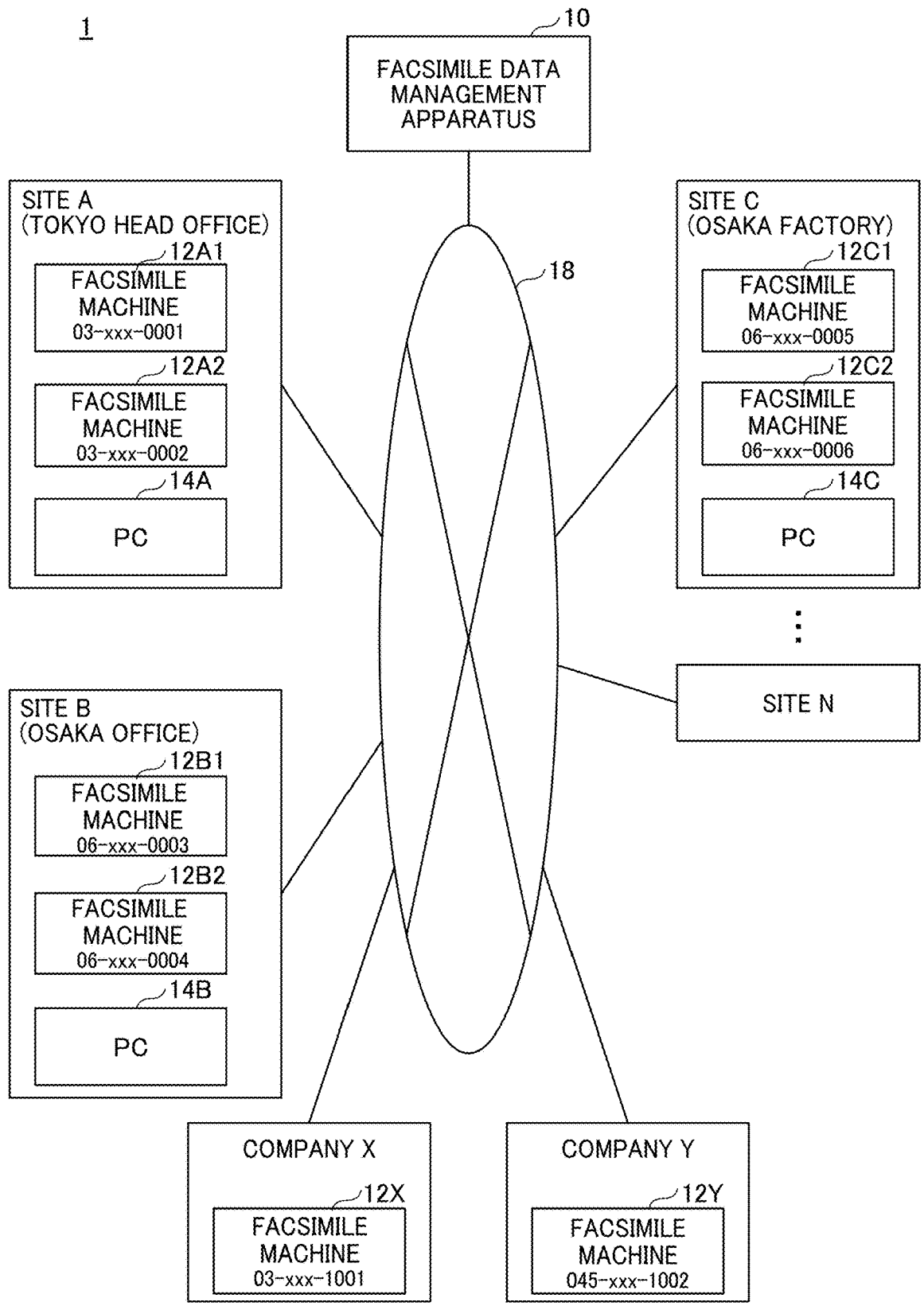
FIG. 1 is a schematic diagram illustrating an example of a configuration of an information processing system according to one embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Facsimile machines may be grouped by a predetermined setting. For example, the facsimile machines installed in the same site or location are grouped, or the facsimile machines used by a certain organization, a certain department, or a certain business are grouped. Facsimile machines received by each of a plurality of groups of facsimile machines may be collectively stored in a file server, a cloud, or the like. In this case, it is difficult to know which of the groups includes the facsimile machine that has received a particular facsimile document.

Referring now to the drawings, embodiments of the present disclosure are described below. As used herein, the singular forms "a," "an," and "the" are intended to include the plural forms as well, unless the context clearly indicates otherwise.

In the present embodiment, the term "group" refers to an assembly grouped by a predetermined condition. The predetermined condition is, for example, a place based on which an activity occurs or a location of an activity (e.g., a platform for the activity). Specifically, the predetermined condition is, for example, a site or a place where a facsimile machine is installed, or an organization, a department, or a business that uses the facsimile machine. However, the condition is not limited thereto. The description below concerns an example in which facsimile machines are grouped by a site.

System Configuration

FIG. 1 is a schematic diagram illustrating an example of a configuration of an information processing system according to the present embodiment. FIG. 1 illustrates a management system 1 that is an information processing system to manage facsimile documents (facsimile data) received by an organization, such as a company having a plurality of sites A to N, from companies X and Y that are business partners (i.e., clients and suppliers). For example, in the management system 1 of FIG. 1, facsimile machines 12A1 and 12A2 and a personal computer (PC) 14A are installed on the site A that is a Tokyo head office. Facsimile machines 12B1 and 12B2 and a PC 14B are installed on the site B that is an Osaka office. Facsimile machines 12C1 and 12C2 and a PC 14C are installed on the site C that is an Osaka factory. Further, a facsimile machine 12X is installed in the company X that is a business partner. Further, a facsimile machine 12Y is installed in the company Y that is another business partner.

Any one of the facsimile machines 12A1 and 12A2 on the site A, the facsimile machines 12B1 and 12B2 on the site B, and the facsimile machines 12C1 and 12C2 on the site C is also simply referred to as the facsimile machine 12 on the site when distinguishment is unnecessary. The facsimile machine 12 on the site, the facsimile machine 12X in the company X, and the facsimile machine 12Y in the company Y can transmit and receive a facsimile document via a network 18 such as a public network. Similarly, any one of the PC 14A on the site A, the PC 14B on the site B, and the PC 14C on the site C is simply referred to as the PC 14 on the site when distinguishment is unnecessary. The PC 14 on the site can communicate with a facsimile data management apparatus 10 via the network 18. The network 18 is, for example, a telephone network, the Internet, or a local area network (LAN) capable of data communication.

A user in the company X transmits a facsimile document from the facsimile machine 12X via the network 18, designating the number (i.e., receiver number) of the facsimile machine 12 on the site to which the facsimile document is transmitted. A user in the company Y transmits a facsimile document from the facsimile machine 12Y to the facsimile machine 12 on the site, designating the receiver number.

The facsimile machine 12 on the site designated by the receiver number receives the facsimile document from the facsimile machine 12X or 12Y. The facsimile machine 12 on the site that receives the facsimile document is referred to as the receiver facsimile machine 12. In the management system 1 according to the present embodiment, the receiver facsimile machine 12 transfers received facsimile data, which will be described later, to the facsimile data management apparatus 10 via the network 18. A description about management of the transferred facsimile data by the facsimile data management apparatus 10 is deferred. The received facsimile data stored by the facsimile data management apparatus 10 can be browsed from the facsimile machine 12 or the PC 14 on the site as described later.

The facsimile machine 12 is an example of an electronic device that transmits and receives a facsimile document. The electronic device that transmits and receives a facsimile document includes an image forming apparatus such as a multifunction peripheral (MFP), which is may be called a multifunction product or multifunction printer, in addition to the facsimile machine 12. The facsimile machine 12 and the PC 14 are examples of electronic terminals that transmit a request to browse received facsimile data to the facsimile data management apparatus 10 and display the received facsimile data. In other words, an "electronic device" may refer to a device capable of facsimile transmission and reception, transmitting a request to browse received facsimile data, and displaying the received facsimile data. The PC 14 is one example. Examples of the electronic device include a head up display (HUD) device, an industrial machine, a network home appliance, a mobile phone, a smartphone, a tablet terminal, a game console, and a personal digital assistant (PDA).

The configuration of the management system 1 illustrated in FIG. 1 is one example. For example, at least a part of the functions of the facsimile machine 12 on the site may be implemented by the facsimile data management apparatus 10. At least a part of the functions of the facsimile data management apparatus 10 may be included in the facsimile machine 12 on the site. The facsimile data management apparatus 10 may be implemented by a plurality of information processing apparatuses. The facsimile data management apparatus 10 may be implemented using a cloud.

Hardware Configuration

Figure 2:
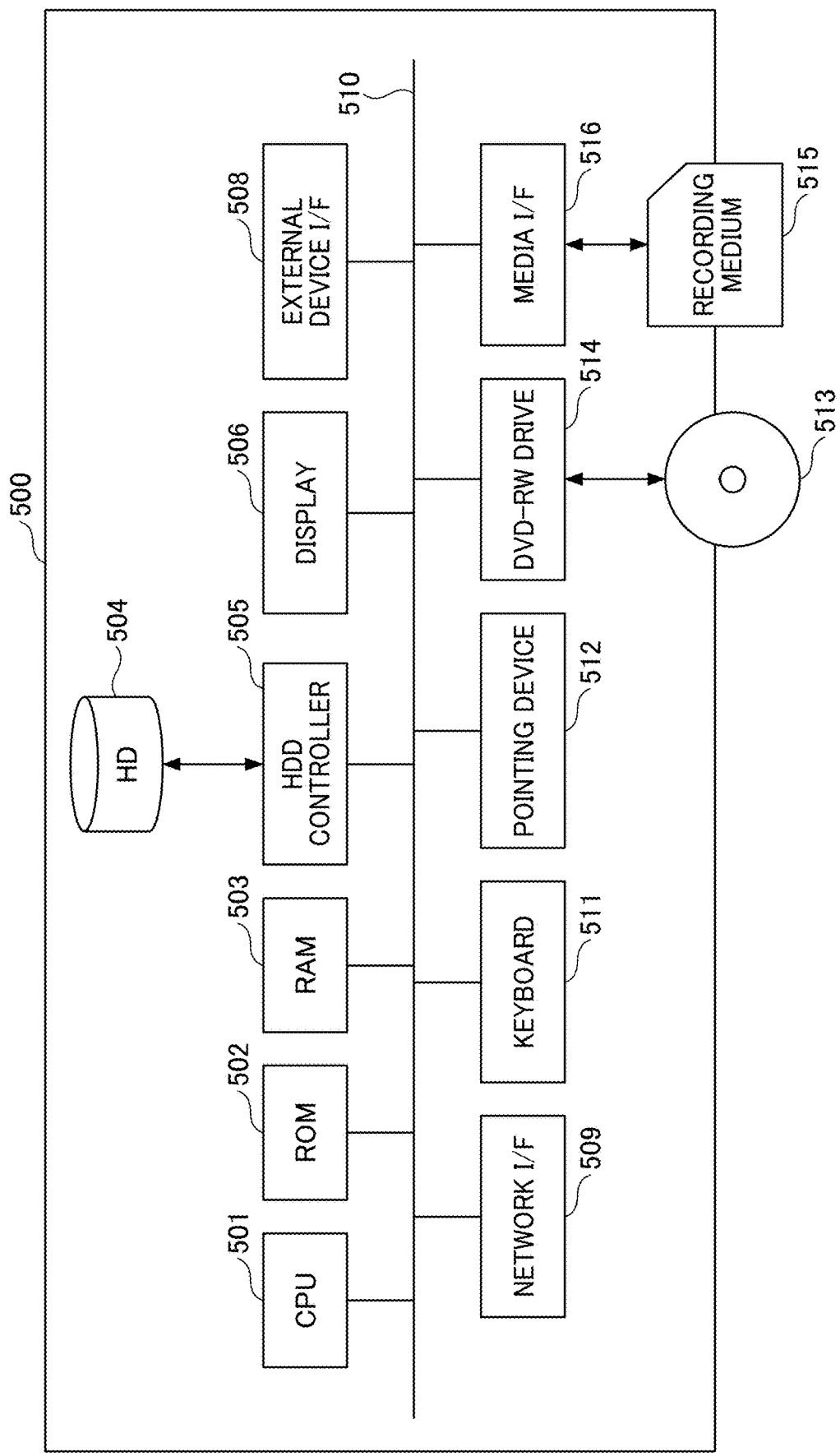
FIG. 2 is a block diagram illustrating an example of a hardware configuration of a computer according to one embodiment of the present disclosure.

Each of the facsimile data management apparatus 10 and the PC 14 on the site illustrated in FIG. 1 is implemented by, for example, a computer 500 having a hardware configuration as illustrated in FIG. 2. FIG. 2 is a block diagram illustrating an example of a hardware configuration of a computer according to the present embodiment.

The computer 500 includes a central processing unit (CPU) 501, a read only memory (ROM) 502, a random access memory (RAM) 503, a hard disk (HD) 504, a hard disk drive (HDD) controller 505, a display 506, an external device interface (I/F) 508, a network I/F 509, a data bus 510, a keyboard 511, a pointing device 512, a digital versatile disk rewritable (DVD-RW) drive 514, and a media I/F 516.

The CPU 501 controls entire operation of the computer 500 according to a program. The ROM 502 stores a program such as an initial program loader (IPL) used for driving the CPU 501. The RAM 503 is used as a work area for the CPU 501. The HD 504 stores various data such as a program. The HDD controller 505 reads or writes various data from or to the HD 504 under control of the CPU 501.

The display 506 displays various information such as a cursor, a menu, a window, a character, and an image. The external device I/F 508 is an interface for connecting various external devices. The external device in this case is, for example, a universal serial bus (USB) memory. The network I/F 509 is an interface for data communication using the network 18. Examples of the data bus 510 include, but not limited to, an address bus and a data bus that electrically connect the components, such as the CPU 501, with one another.

The keyboard 511 is one example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable recording medium. The removable storage medium is not limited to the DVD-RW and may be a DVD-recordable (DVD-R) or the like. The media I/F 516 controls reading and writing (storing) of data from and to a recording medium 515 such as a flash memory.

Figure 3:
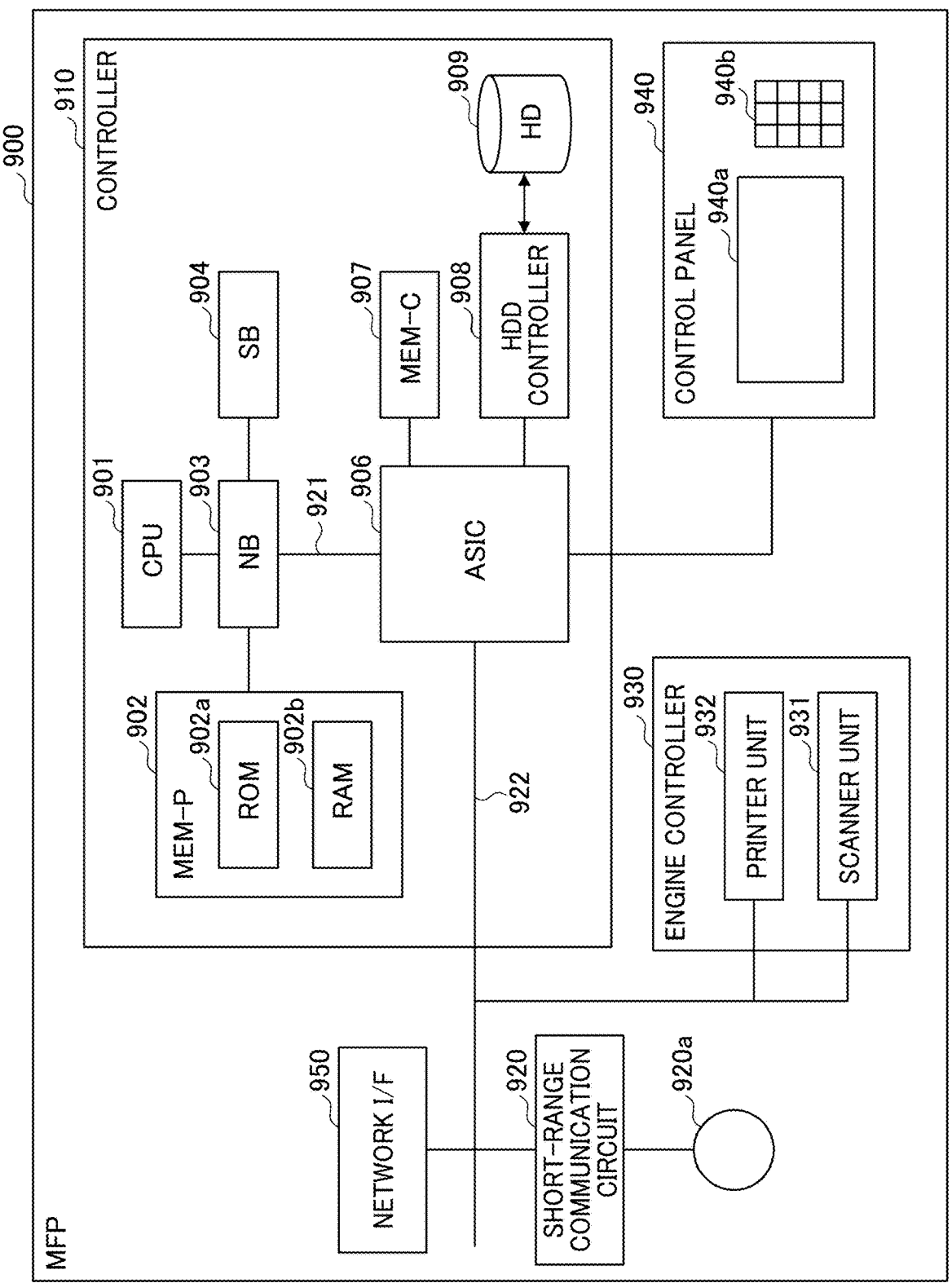
FIG. 3 is a block diagram illustrating an example of a hardware configuration of a multifunction peripheral (MFP) according to one embodiment of the present disclosure.

The facsimile machine 12 on the site illustrated in FIG. 1 can be an MFP 900 having a hardware configuration, for example, as illustrated in FIG. 3. FIG. 3 is a block diagram illustrating an example of the hardware configuration of the MFP 900 according to the present embodiment.

The MFP 900 illustrated in FIG. 3 includes a controller 910, a short-range communication circuit 920, an engine controller 930, a control panel 940, and a network I/F 950. The controller 910 includes a CPU 901 as a main processor of a computer, a system memory (MEM-P) 902, a north bridge (NB) 903, a south bridge (SB) 904, an application specific integrated circuit (ASIC) 906, a local memory (MEM-C) 907 as a storage area, a hard disk drive (HDD) controller 908, and a hard disk (HD) 909 as a storage area. The NB 903 and the ASIC 906 are connected via an accelerated graphics port (AGP) bus 921.

The CPU 901 controls the entire operation of the MFP 900. The NB 903 is a bridge that connects the CPU 901 to the system memory (MEM-P) 902, the SB 904, and the AGP bus 921. The NB 903 includes a memory controller that controls reading and writing from and to the system memory (MEM-P) 902, a peripheral component interconnect (PCI) master, and an AGP target.

The system memory (MEM-P) 902 includes a ROM 902a and a RAM 902b. The ROM 902a stores data and program for implementing various functions of the controller 910. The RAM 902b is used to load the program and the data. The RAM 902b is also used as a drawing memory to store drawing data for printing. The program stored in the RAM 902b may be stored in any computer-readable storage (recording) medium, such as a compact disc-read only memory (CD-ROM), compact disc-recordable (CD-R), or digital versatile disc (DVD), in a file format installable or executable by the computer, for distribution.

The SB 904 is a bridge that connects the NB 903 with a PCI device or a peripheral device. The ASIC 906 is an integrated circuit (IC) dedicated to an image processing use and includes a hardware element for image processing. The ASIC 906 is a bridge that connects the AGP bus 921, a PCI bus 922, the HDD controller 908, and the local memory (MEM-C) 907 with each other.

The ASIC 906 includes a PCI target, an AGP master, an arbiter (ARB) as a central processor of the ASIC 906, a memory controller to control the local memory (MEM-C) 907, a plurality of direct memory access controllers (DMACs) to rotate image data, and a PCI unit. By converting coordinates of the image data with a hardware logic, image data are rotated. The PCI unit transfers data between a scanner unit 931 and a printer unit 932 via the PCI bus 922. The ASIC 906 may be connected to a USB interface, or the Institute of Electrical and Electronics Engineers 1394 (IEEE1394) interface.

The local memory (MEM-C) 907 is used as a buffer for image data to be copied or coding. The HD 909 is a storage area that stores various image data, font data for printing, and form data. The HD 909 controls the reading or writing of data from or into the HD 909 under the control of the CPU 901. The AGP bus 921 is a bus interface for a graphics accelerator card, which is proposed to accelerate graphics processing. Through directly accessing the system memory (MEM-P) 902 by high-throughput, speed of the graphics accelerator card is improved.

Further, the short-range communication circuit 920 includes an antenna for short-range communication circuit 920a. The short-range communication circuit 920 is a communication circuit in compliance with the near field communication (NFC), the Bluetooth (registered trademark), and the like.

The engine controller 930 includes the scanner unit 931 and the printer unit 932. The control panel 940 includes a panel display 940*a* and an operation device 940*b*. The panel display 940*a* is, e.g., a touch panel that displays current settings or a selection screen and receives a user input. The operation device 940*b* includes, e.g., a numeric keypad and a start key. The numeric keypad receives assigned values of image forming parameters such as an image density parameter. The start key receives an instruction to start copying.

The controller 910 controls entire operation of the MFP 900. For example, the controller 910 controls drawing, communication, or user inputs to the control panel 940. The scanner unit 931 or the printer unit 932 includes an image processing unit for, for example, error diffusion and gamma conversion.

Note that, in response to an instruction to select a specific application through the control panel 940 by an application switch key, the MFP 900 sequentially selects document server, coping, printing, and facsimile transmission functions. The MFP 900 enters a document server mode to store document data with selection of the document server function and enters a copy mode with selection of the copy function. Further, the MFP 900 enters a printer mode with selection of the printing function and enters a facsimile mode with selection of the facsimile function.

The network I/F 950 is an interface for data communication using the network 18. The short-range communication circuit 920 and the network I/F 950 are electrically connected to the ASIC 906 through the PCI bus 922.

To enable authentication, by an IC card, of a user to use the MFP 900, the MFP 900 includes a built-in IC card reader. Alternatively, the IC card reader is attached to the MFP 900. The MFP 900 reads identification information unique to the IC card from a radio frequency (RF) tag embedded in the IC card by wireless communication. In another example, the IC card is included in a smart device such as a smartphone. In still another example, the MFP 900 uses any suitable device other than the IC card reader, such as a biometric authentication device (that recognizes fingerprint, palm print, iris, face, etc.) or a barcode reading device.

Functional Configuration

Figure 4:
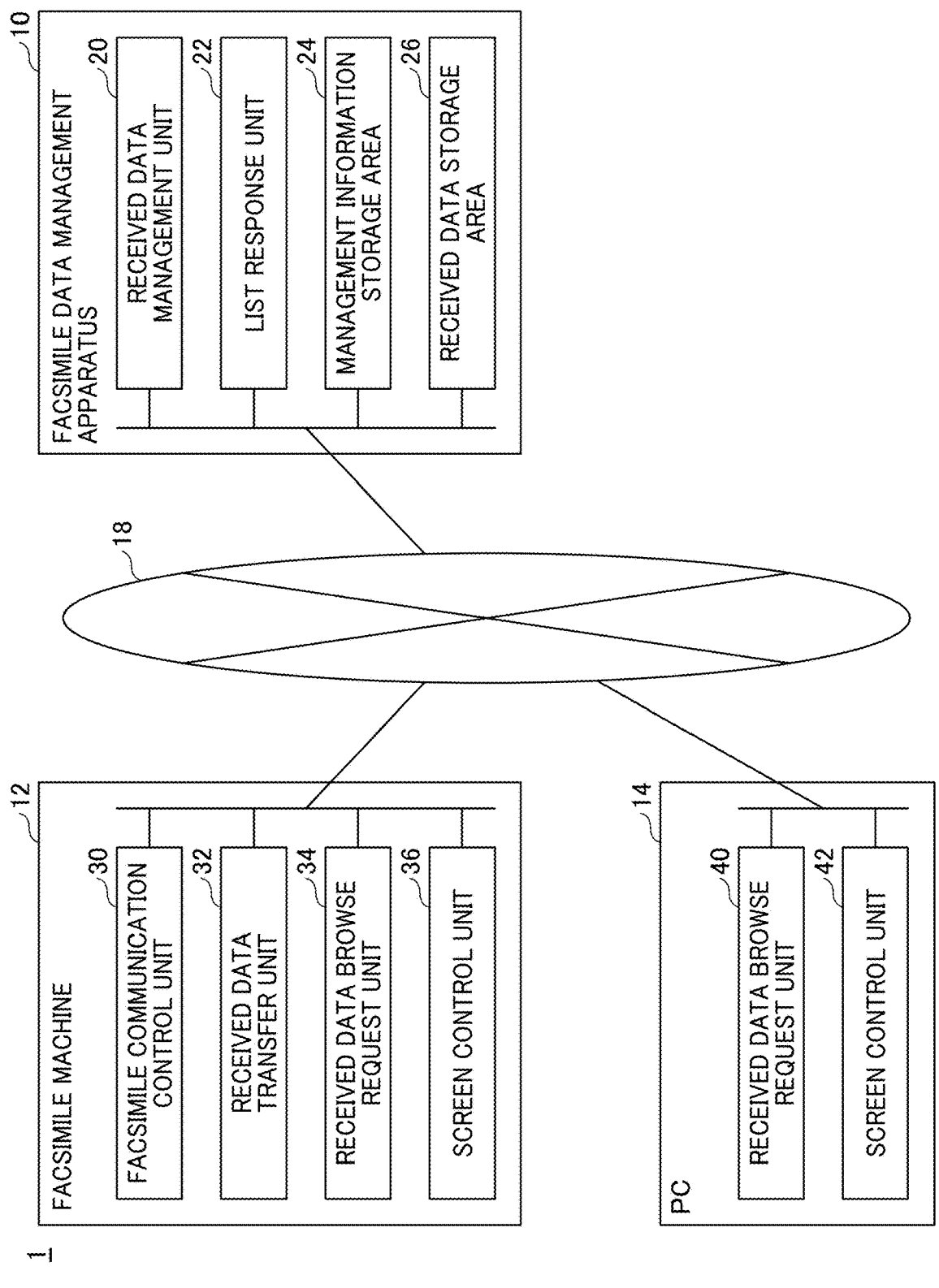
FIG. 4 is a schematic diagram illustrating an example of a functional configuration of the management system illustrated in FIG. 1.

The management system 1 according to the present embodiment has a functional configuration, for example, as illustrated in FIG. 4. FIG. 4 is a schematic diagram illustrating an example of the functional configuration of the management system according to the present embodiment. FIG. 4 illustrates one of the facsimile machines 12 and one of the PCs 14 on the site and does not illustrate the facsimile machines 12X and 12Y of the business partners for simplicity. In the functional configuration of FIG. 4, some of the components unnecessary for the description of the present embodiment are omitted for simplicity.

The facsimile machine 12 on the site of FIG. 4 includes a facsimile communication control unit 30, a received data transfer unit 32, a received data browse request unit 34, and a screen control unit 36. The facsimile machine 12 on the site executes a program to implement, for example, the functional units illustrated in FIG. 4.

The facsimile communication control unit 30 transmits and receives a facsimile document using a facsimile communication protocol. The received data transfer unit 32 transfers the received facsimile document (received facsimile data) to the facsimile data management apparatus 10. The received facsimile data includes information such as received image data, a sender number, a receiver number, and a reception date and time. The sender number is an example of information on a sender (transmission source) of the received facsimile data. Another example of the information of the sender is the information on the group (e.g., company name) to which the sender facsimile machine belongs. The receiver number is an example of receiver information (destination information) of the received facsimile data.

The received data browse request unit 34 transmits, to the facsimile data management apparatus 10, a request of browsing of received facsimile data stored by the facsimile data management apparatus 10 based on an operation by a user on the site, and receives a list of received facsimile data and the received facsimile data described later. The screen control unit 36 displays, on the control panel 940, the list of received facsimile data and the received facsimile data.

The PC 14 on the site in FIG. 4 includes a received data browse request unit 40 and a screen control unit 42. The PC 14 on the site executes a program to implement, for example, the functional units illustrated in FIG. 4.

The received data browse request unit 40 transmits, to the facsimile data management apparatus 10, a request of browsing of received facsimile data stored by the facsimile data management apparatus 10 based on an operation by a user on the base, and receives a list of received facsimile data and the received facsimile data. The screen control unit 42 displays, on the display 506, the list of received facsimile data and the received facsimile data.

As described above, FIG. 4 illustrates an example of the management system 1 in which the received facsimile data stored by the facsimile data management apparatus 10 can be browsed from the facsimile machine 12 and the PC 14. Alternatively, the management system 1 may enable browsing of the received facsimile data stored by the facsimile data management apparatus 10 from either one of the facsimile machine 12 and the PC 14.

The facsimile data management apparatus 10 illustrated in FIG. 4 includes a received data management unit 20, a list response unit 22, a management information storage area 24, and a received data storage area 26. The facsimile data management apparatus 10 executes a program to implement, for example, the functional units illustrated in FIG. 4.

The received data management unit 20 manages the received facsimile data transferred from the facsimile machines 12 on the sites. The list response unit 22 generates the list of received facsimile data as described below in response to a received facsimile data browse request from the facsimile machine 12 or the PC 14 on the site, and transmits the list of received facsimile data to the browse request source.

The management information storage area 24 stores various information necessary for processing performed by the facsimile data management apparatus 10. The received data storage area 26 stores the received facsimile data transferred from the facsimile machine 12 on the site.

A description is given of an example of display of a list of received facsimile data on the facsimile machine 12 and the PC 14 on the site. FIGS. 5A to 6B illustrate display examples of a list of received facsimile data on the facsimile machine and the PC on the site.

Figure 5B:
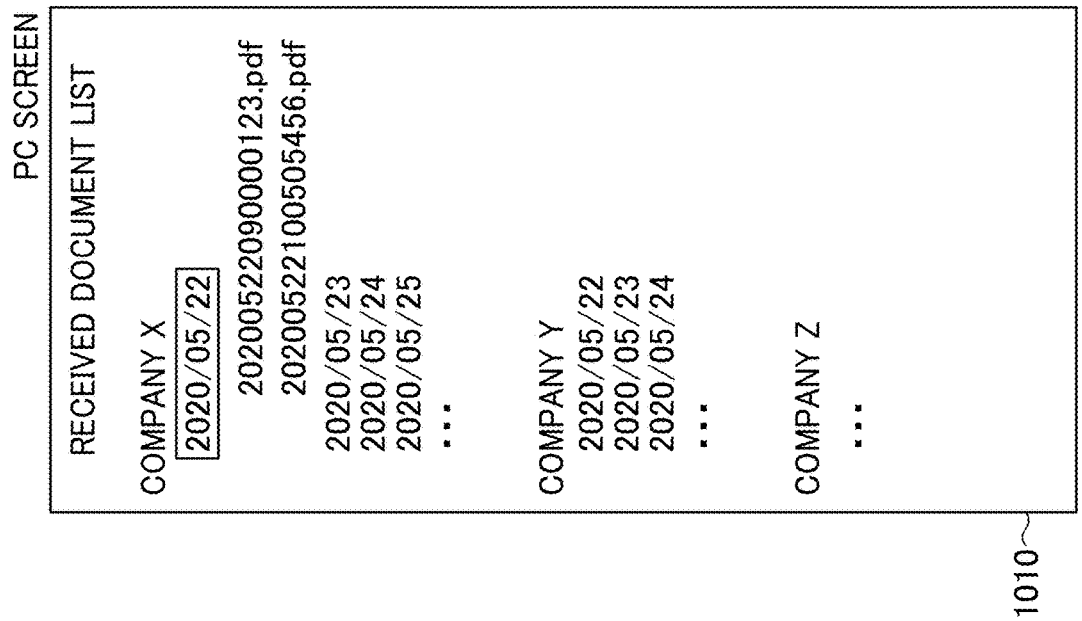
FIGS. 5A and 5B illustrate examples of display of a received facsimile data list on a facsimile machine on a site.
Figure 5A:
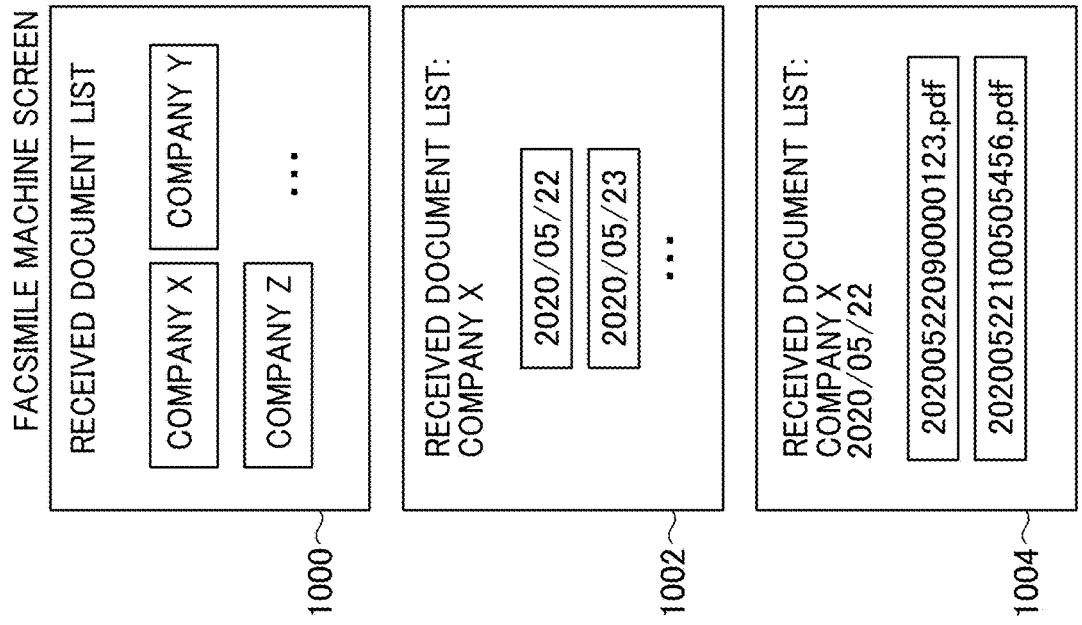

FIG. 5A illustrates an example of the list of received facsimile data displayed on the facsimile machine 12 on the site. In response to selecting the business partner of the received facsimile data to be browsed on a screen 1000 and selecting the reception date and time on a screen 1002, the list of the received facsimile data narrowed down by the business partner and the reception date and time is displayed on a screen 1004.

FIG. 5B illustrates an example of display of the list of received facsimile data list on the PC 14 on the site. FIG. 5B illustrates a screen 1010 that displays the list of received facsimile data classified in a tree structure by the business partner and the reception date and times.

Figure 6B:
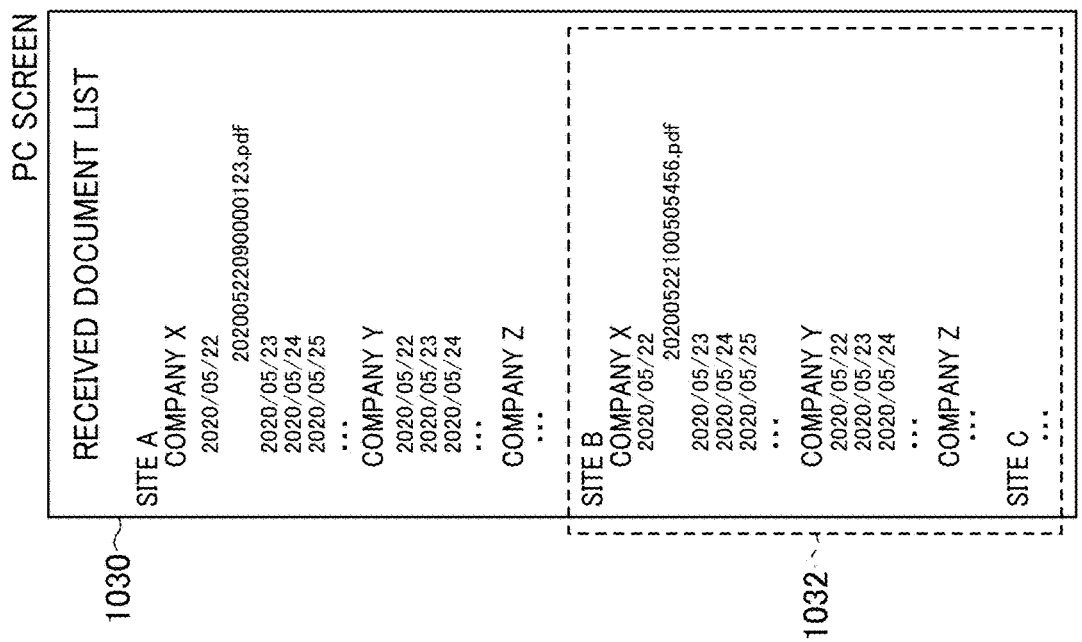
FIGS. 6A and 6B illustrate examples of display of a received facsimile data list on a personal computer (PC) on a site.
Figure 6A:
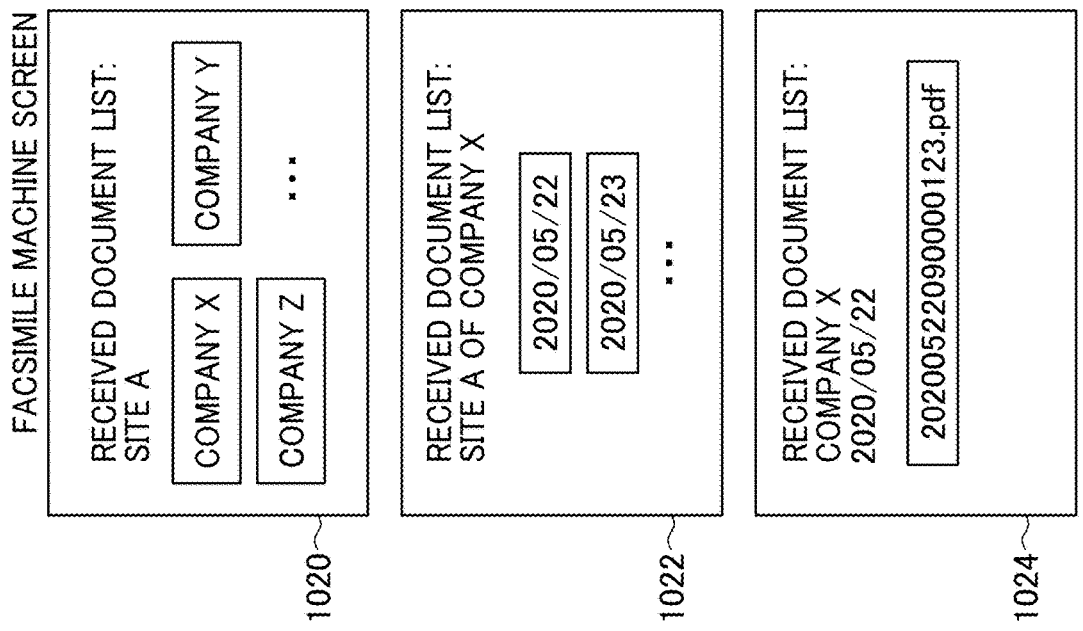

The management system 1 according to the present embodiment displays, in addition to the display example illustrated in FIGS. 5A and 5B, a list of received facsimile data narrowed down by the site or a list of received facsimile data classified in the tree structure by the sites as illustrated in FIGS. 6A and 6B.

FIG. 6A illustrates an example of the list of received facsimile data displayed on the facsimile machine 12 on the site. For example, a screen 1020 is an example of a screen for selecting the business partner (i.e., sender) of the received facsimile data to be browsed, out of the facsimile data received by the facsimile machine 12A1 or 12A2 on the site A.

A screen 1022 is an example of a screen for selecting the reception date and time of the received facsimile data to be browsed, out of the received facsimile data selected on the screen 1020. A screen 1024 displays a list of received facsimile data narrowed down by the site, the business partner (sender), and the reception date and time.

FIG. 6B illustrates an example of the list of received facsimile data displayed on the PC 14 on the site. For example, FIG. 6B illustrates a screen 1030 that displays a list of received facsimile data classified in a tree structure by the sites, the business partners, and the reception date and times. For example, when the PC 14 on the site A displays the list of the received facsimile data, as illustrated in FIG. 6B, the facsimile data received by the facsimile machine 12A1 or the facsimile machine 12A2 on the site A may be preferentially displayed. Alternatively, the facsimile data received by facsimile machines installed on other locations than the site A, surrounded by a dotted line 1032 in FIG. 6B, may be hidden.

Figure 7:
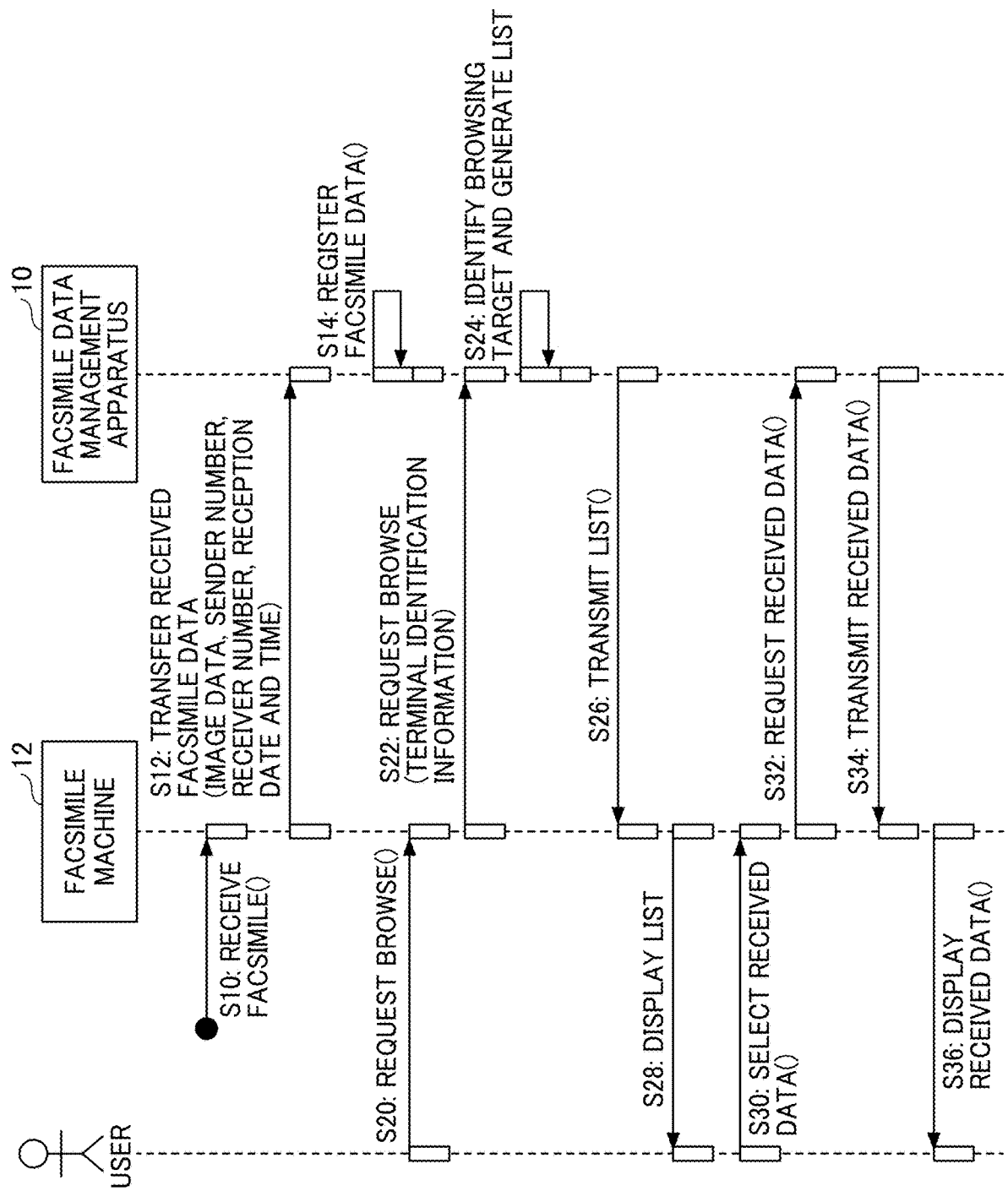
FIG. 7 is a sequence diagram illustrating an example of operation executed by the management system illustrated in FIG. 4.

FIG. 7 is a sequence diagram illustrating an example of operation executed by the management system 1 according to the present embodiment. In step S10, the facsimile machine 12 on the site receives a facsimile document from a business partner, for example, the company X or the company Y. In S12, the received data transfer unit 32 of the facsimile machine 12 on the site that has received the facsimile document transfers the received facsimile data to the facsimile data management apparatus 10. The received facsimile data transferred to the facsimile data management apparatus 10 includes information such as image data, a sender number, a receiver number, and a reception date and time. The received facsimile data transferred to the facsimile data management apparatus 10 may further include information such as the number of pages and the communication line type.

The facsimile data management apparatus 10 that has received the facsimile data from the facsimile machine 12 on the site proceeds to step S14. For example, the facsimile data management apparatus 10 registers the received facsimile data according to the procedure illustrated in FIG. 8, to create a folder in a structure illustrated in FIG. 9. The facsimile data management apparatus 10 stores the image data in the folder, to manage the facsimile reception data.

Figure 8:
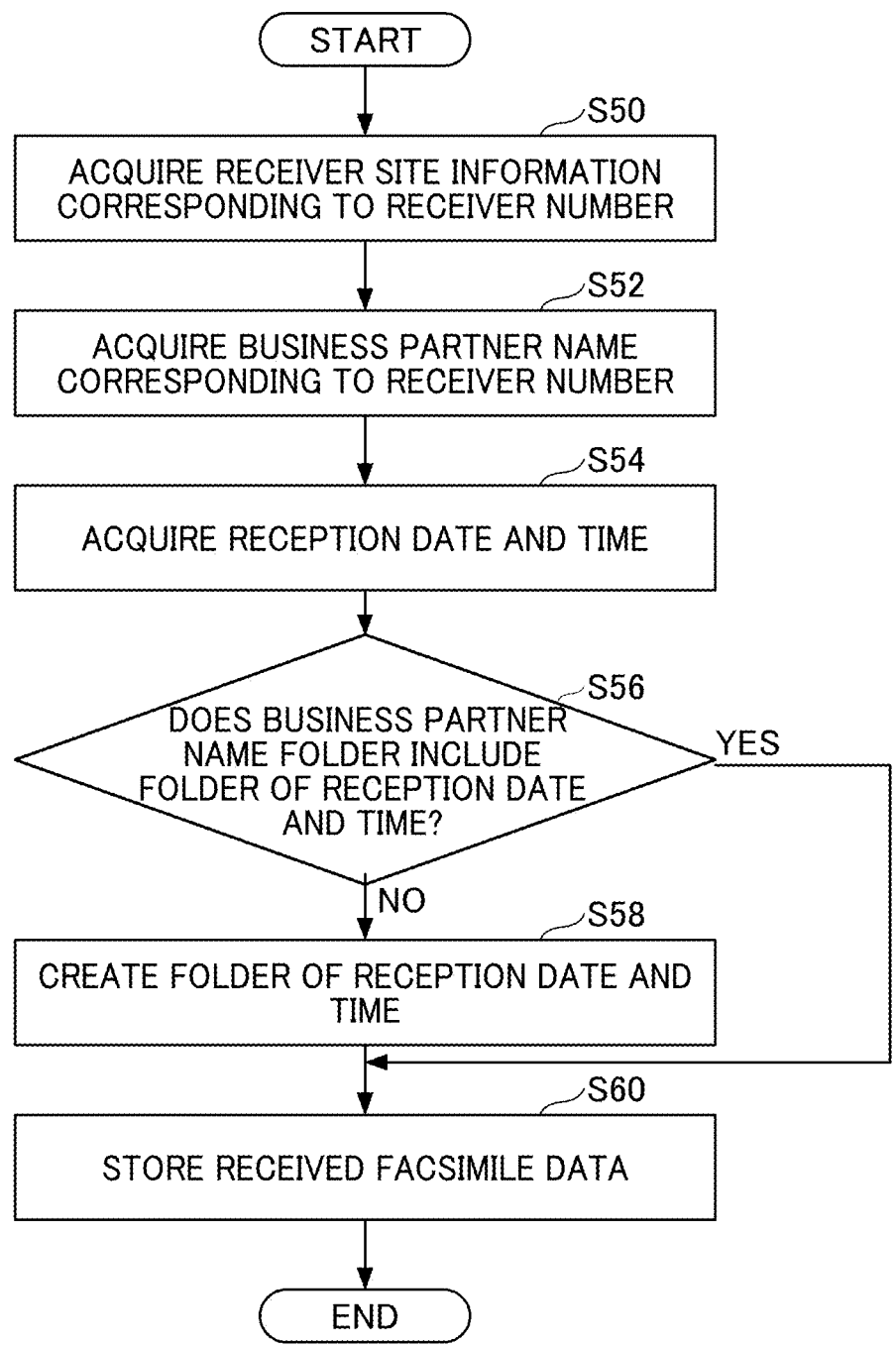
FIG. 8 is a flowchart illustrating an example of a facsimile data registration process performed by the management system illustrated in FIG. 4.
Figure 9:
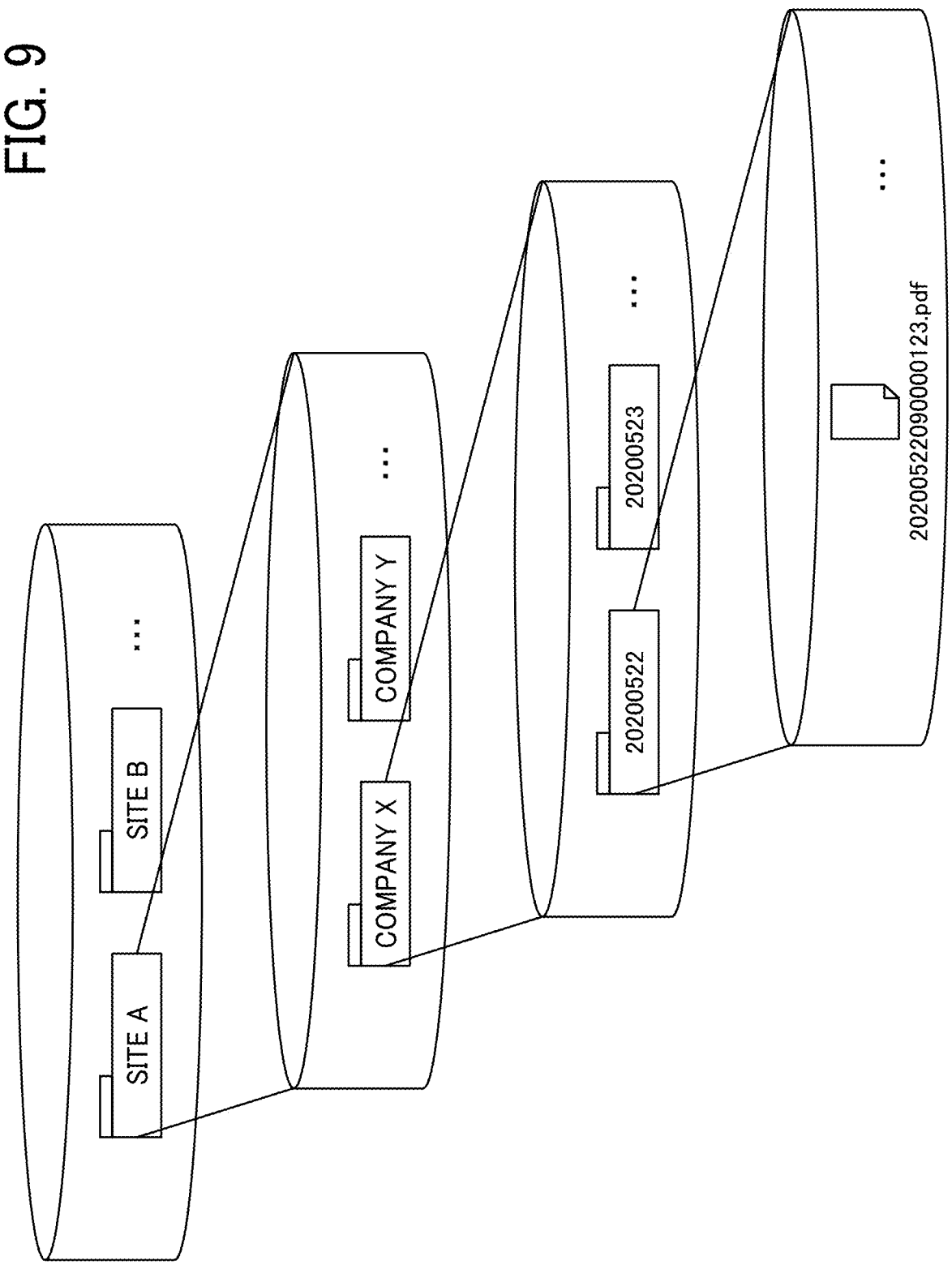
FIG. 9 illustrates an example of a folder structure created by the management system illustrated in FIG. 4.

FIG. 8 is a flowchart illustrating an example of facsimile data registration process executed by the management system according to the present embodiment. FIG. 9 illustrates an example of a folder structure created by the management system according to the present embodiment. The folder structure illustrated in FIG. 9 is a hierarchical structure that includes a receiver site name folder, a business partner name folder, and a reception date and time name folder. The receiver site name folder includes business partner name folders. The business partner name folder includes reception date and time name folders. Received facsimile data is stored in the reception date and time name folder.

In step S50 in FIG. 8, the received data management unit 20 of the facsimile data management apparatus 10 acquires the receiver site information corresponding to the receiver number of the received facsimile data by using, for example, a table illustrated in FIGS. 10A and 10B stored in the management information storage area 24.

FIGS. 10A and 10B are tables (association information) as examples of information stored in the management information storage area 24. FIG. 10A illustrates an example of a table that associates a receiver number (terminal identification information) with receiver site information. FIG. 10B is an example of a table that associates a sender number with the information on the business partner. In step S50, the received data management unit 20 acquires information on the receiver site corresponding to the receiver number of the received facsimile data using the table illustrated in FIG. 10A.

In step S52, the received data management unit 20 acquires information on the business partner corresponding to the sender number of the received facsimile data by using, for example, the table illustrated in FIG. 10B. In step S54, the received data management unit 20 acquires information on the reception date and time of the received facsimile data.

In step S56, the received data management unit 20 refers to, for example, the folder structure illustrated in FIG. 9. The received data management unit 20 identifies the business partner name folder corresponding to the receiver site information acquired in the step S50 and the business partner information acquired in the step S52, and determines whether the identified business partner name folder includes a reception date and time name folder corresponding to the reception date and time information acquired in step S54.

Determining that there is no reception date and time name folder corresponding to the reception date and time information acquired in step S54, the received data management unit 20 proceeds to step S58 and creates a reception date and time name folder corresponding to the reception date and time information acquired in step S54. The process proceeds to step S60. Determining that there is a reception date and time name folder corresponding to the reception date and time information acquired in step S54, the received data management unit 20 skips step S58 and proceeds to step S60.

In step S60, the received data management unit 20 stores the image data in the reception date and time name folder corresponding to the receiver site information acquired in step S50, the business partner (sender) information acquired in step S52, and the reception date and time information acquired in step S54, thereby storing the received facsimile data. As described above, the received data management unit 20 stores the received facsimile data in association with the group to which the facsimile machine 12 that has received the received facsimile data belongs.

In the flowchart illustrated in FIG. 8, when the folder structure does not include the corresponding reception date and time name folder, the received data management unit 20 creates the corresponding reception date and time name folder. The facsimile data registration process may further include creating the corresponding site name folder and the corresponding business partner (sender) name folder when the folder structure does not include the corresponding site name folder and the corresponding sender name folder.

Returning to step S20 in FIG. 7, the facsimile machine 12 on the site receives, from the user on the site, an operation for requesting browsing of the received facsimile data stored by the facsimile data management apparatus 10. In step S22, the received data browse request unit 34 of the facsimile machine 12 that has received the operation of the browse request from the user on the site transmits, to the facsimile data management apparatus 10, a browse request of the received facsimile data managed by the facsimile data management apparatus 10. The browse request transmitted in step S22 includes the receiver number (terminal identification information) of the facsimile machine 12 as the browse request source.

Figure 11:
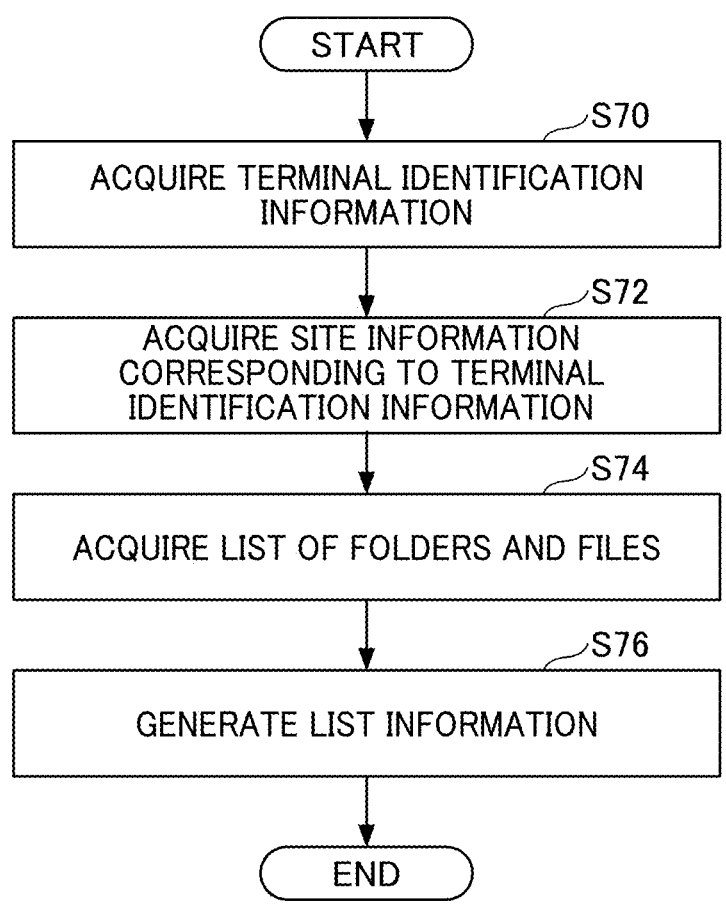
FIG. 11 is a flowchart illustrating an example of process of creating a received facsimile data list performed by the management system illustrated in FIG. 4.

In step S24, the list response unit 22 of the facsimile data management apparatus 10 identifies a browsing target in the procedure illustrated in FIG. 11 based on the browse request received from the facsimile machine 12, and creates a list of received facsimile data.

FIG. 11 is a flowchart illustrating an example of a process of creating a list of received facsimile data, performed by the management system according to the present embodiment. In step S70, the list response unit 22 of the facsimile data management apparatus 10 acquires the receiver number (terminal identification information) of the facsimile machine 12 as the browse request source included in the browse request in step S22.

In step S72, the list response unit 22 acquires the site information (i.e., group information such as site name) corresponding to the receiver number (terminal identification information) of the facsimile machine 12 that is the source of the browse request, using, for example, the table illustrated in FIG. 10A. In step S74, the list response unit 22 acquires a list of the folders and the files in FIG. 9 stored in the site name folder corresponding to the site information acquired in step S72. In step S76, the list response unit 22 generates a list of received facsimile data (list information) based on the list of folders and files acquired in step S74.

Figures 12, 13:
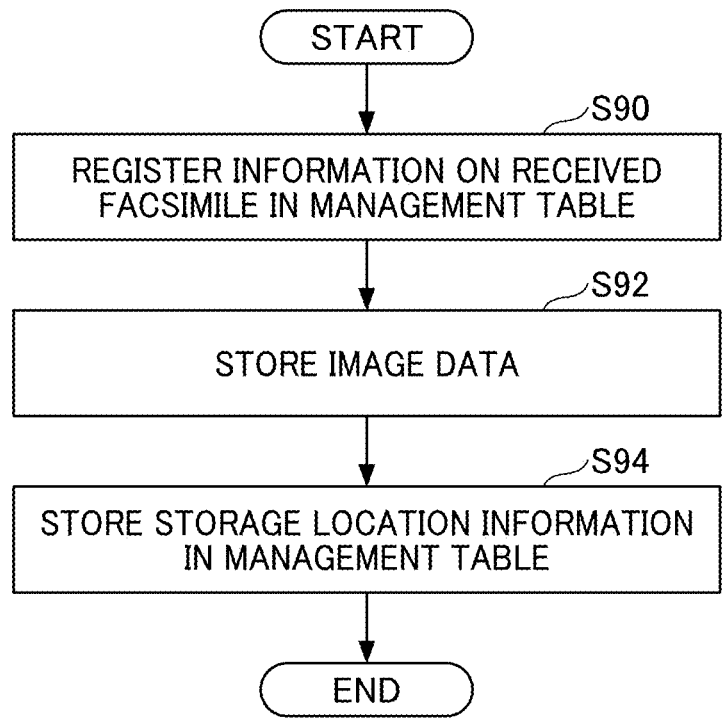
FIG. 12 is a table illustrating an example of information stored in the management information storage area illustrated in FIG. 4.
FIG. 13 is a flowchart illustrating an example of a facsimile data registration process performed by the management system illustrated in FIG. 4.

In the flowchart in FIG. 11, the site information is acquired from the receiver number of the facsimile machine 12 as the browse request source. Alternatively, the site information may be acquired using a table illustrated in FIG. 12, for example. FIG. 12 illustrates an example of information stored in the management information storage area 24. FIG. 12 illustrates an example of a table for associating the global internet protocol (IP) address of the facsimile machine 12 on the site with the receiver site information. Using the table of FIG. 12, the list response unit 22 can acquire the site information corresponding to the global IP address of the facsimile machine 12 that is the browse request source. In step S72 of FIG. 11, for example, when the receiver number of the facsimile machine 12 as the browse request source is not registered and the site information corresponding to the receiver number is not available, the site information corresponding to the global IP address may be acquired.

The table illustrated in FIG. 12 is an example. Alternatively, for example, the site information may be acquired using a table that associates receiver site information with combined information of a global ID address of the site and a local address (e.g., a department) of the site. With use of such a table associating receiver site information with combined information of a global ID address of the site and a local address (e.g., a department) of the site, a range of the receiver sites can be finely set.

Returning to step S26 of FIG. 7, the list response unit 22 transmits, as a response, the list of received facsimile data created in step S24 to the facsimile machine 12 as the browse request source. In this manner, in response to the browse request of the received facsimile data, the list response unit 22 transmits the list of received facsimile data classified according to, at least, the group information. The group information is, for example, the group to which the receiver machine belongs, the group to which the source of the browse request belongs, or the group to which the sender belongs. In step S28, the screen control unit 36 of the facsimile machine 12 displays, on the control panel 940, the screens 1020, 1022, and 1024 (illustrated in FIG. 6A) that present the list of the received facsimile data.

Thus, the management apparatus 10 according to the present embodiment facilitates management of facsimile data received by an electronic device grouped with another electronic device, or facilitates management of facsimile data received by an electronic device from a plurality of electronic devices.

In step S30, the user on the site performs an operation for shifting the screen 1020 to the screens 1022 and to 1024 illustrated in FIG. 6A, and selects, on the screen 1024, the received facsimile data to be browsed. In step S32, receiving the operation of selecting the received facsimile data from the user on the site, the received data browse request unit 34 of the facsimile machine 12 transmits, to the facsimile data management apparatus 10, a request to acquire the received facsimile data selected from the user on the site. The list response unit 22 of the facsimile data management apparatus 10 identifies the received facsimile data to be acquired, based on the acquisition request received from the facsimile machine 12. In step S34, the list response unit 22 transmits, as a response, the identified facsimile data to the facsimile machine 12 that is the acquisition request source. In step S36, the screen control unit 36 of the facsimile machine 12 as the acquisition request source displays the received facsimile data on the control panel 940.

The sequence diagram of FIG. 7 illustrates an example in which the facsimile machine 12 on the site transmits a browse request to the facsimile data management apparatus 10. In the case where the PC 14 on the site transmits a browse request to the facsimile data management apparatus 10, the process is the same as that illustrated in FIG. 7. In the example illustrated in FIG. 8, a folder having the structure illustrated in FIG. 9 is created, and image data is stored in the folder, to manage the received facsimile data (that is, store the facsimile data in association with, e.g., group information on the destination of the received facsimile data). For example, the facsimile data management apparatus 10 creates the management table illustrated in FIG. 14 by registering facsimile data according to the procedure illustrated in FIG. 13, so as to manage the received facsimile data (that is, store the facsimile data in association with, e.g., sender information, receiver information, and storage location information). As illustrated in FIG. 14, the received data management unit 20 may refer to the table of FIG. 10A and store the information on site corresponding to the value of the item "receiver number" of the management table of FIG. 14 as the value of the item "receiver site." Alternatively, without storing the receiver site in the management table of FIG. 14, the received data management unit 20 may refer to the table of FIG. 10A at each acquisition of the site information corresponding to the receiver number.

FIG. 13 is a flowchart illustrating an example of facsimile data registration process executed by the management system according to the present embodiment. FIG. 14 is a table illustrating an example of a management table created by the management system according to the present embodiment.

In step S90 of FIG. 13, the received data management unit 20 of the facsimile data management apparatus 10 registers the receiver number, the sender number, and the reception date and time of the received facsimile data in the management table of FIG. 14. In addition, the received data management unit 20 performs operations similar to those in steps S50 and S52 in FIG. 8, to acquire the receiver site information corresponding to the receiver number and the business partner information corresponding to the sender number, and register the acquired information in the management table in FIG. 14 as information on the receiver site and the sender.

In step S92, the received data management unit 20 stores the image data of the received facsimile data in, for example, the received data storage area 26. Then, in step S94, the received data management unit 20 registers the storage location information (for example, a path) of the image data stored in step S92 as the received data storage location in the management table of FIG. 14. As described above, the received data management unit 20 stores the received facsimile data in association with the group to which the facsimile machine 12 that has received the facsimile data belongs.

Figure 15:
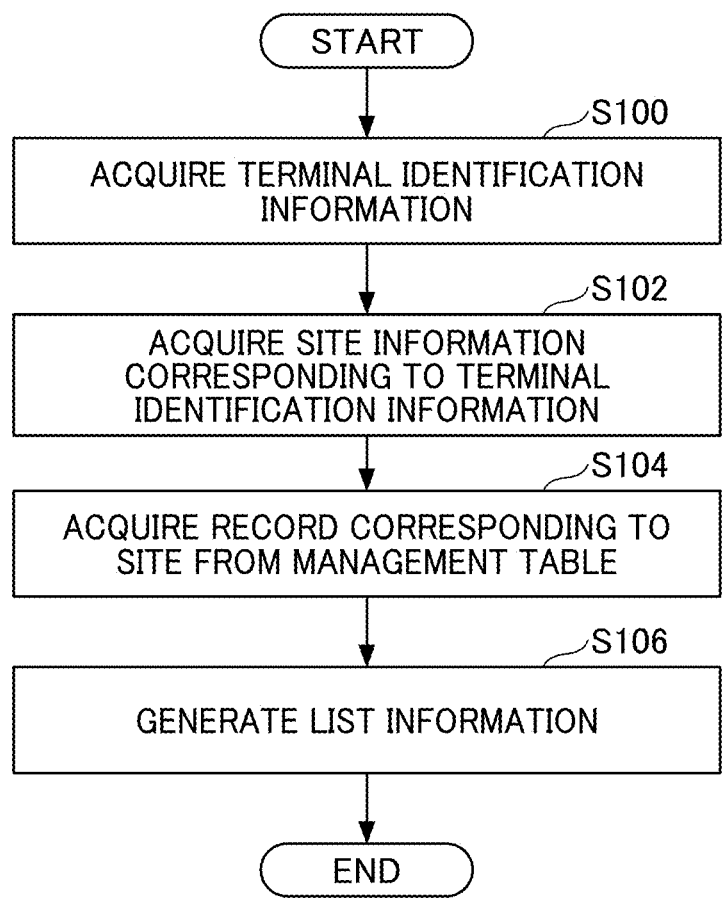
FIG. 15 is a flowchart illustrating another example of the process of creating a received facsimile data list performed by the management system illustrated in FIG. 4.

When the management table of FIG. 14 is used, the processing of step S24 of FIG. 7 is performed by the procedure illustrated in FIG. 15, for example. FIG. 15 is a flowchart illustrating an example of processing for creating a received facsimile data list performed by the management system according to the present embodiment. In step S100, the list response unit 22 of the facsimile data management apparatus 10 acquires the receiver number (terminal identification information) of the facsimile machine 12 that has transmitted the browse request, from the browse request transmitted in step S22.

In step S102, the list response unit 22 acquires the site information corresponding to the receiver number (terminal identification information) of the facsimile machine 12 that has transmitted the browse request, using, for example, the table illustrated in FIG. 10A. In step S104, the list response unit 22 acquires a record having the item "receiver site" corresponding to the site information acquired in step S102 from the management table of FIG. 14. In step S106, the list response unit 22 generates a list of received facsimile data (list information) based on the acquired record of the management table. The list response unit 22 transmits the list as a response to the facsimile machine 12 that is the source of the browse request. In this manner, based on the browse request of the received facsimile data, the list response unit 22 transmits a list of the received facsimile data classified according to, at least, the group information.

In step S90 in FIG. 13, the received data management unit 20 may omit registering, in the management table of FIG. 14, the receiver site information corresponding to the receiver number. In stead, in S102, the list response unit 22 acquires, from the table of FIG. 10A, the receiver number corresponding to the site information acquired in step S102, and acquires, from the management table of FIG. 14, the record having the item "receiver number" corresponding to the acquired receiver number. That is, the received data management unit 20 manages, using the table of FIG. 10A, the received facsimile data in association with the information on the site (i.e., group information) to which the facsimile machine 12 that has received the facsimile data belongs.

As described above, the management system 1 according to the present embodiment classifies the facsimile data received by the facsimile machines 12 installed in the plurality of sites according to the site information, thereby facilitating management of the facsimile data received by the facsimile machines 12 installed in the plurality of sites.

Variations

Figure 16:
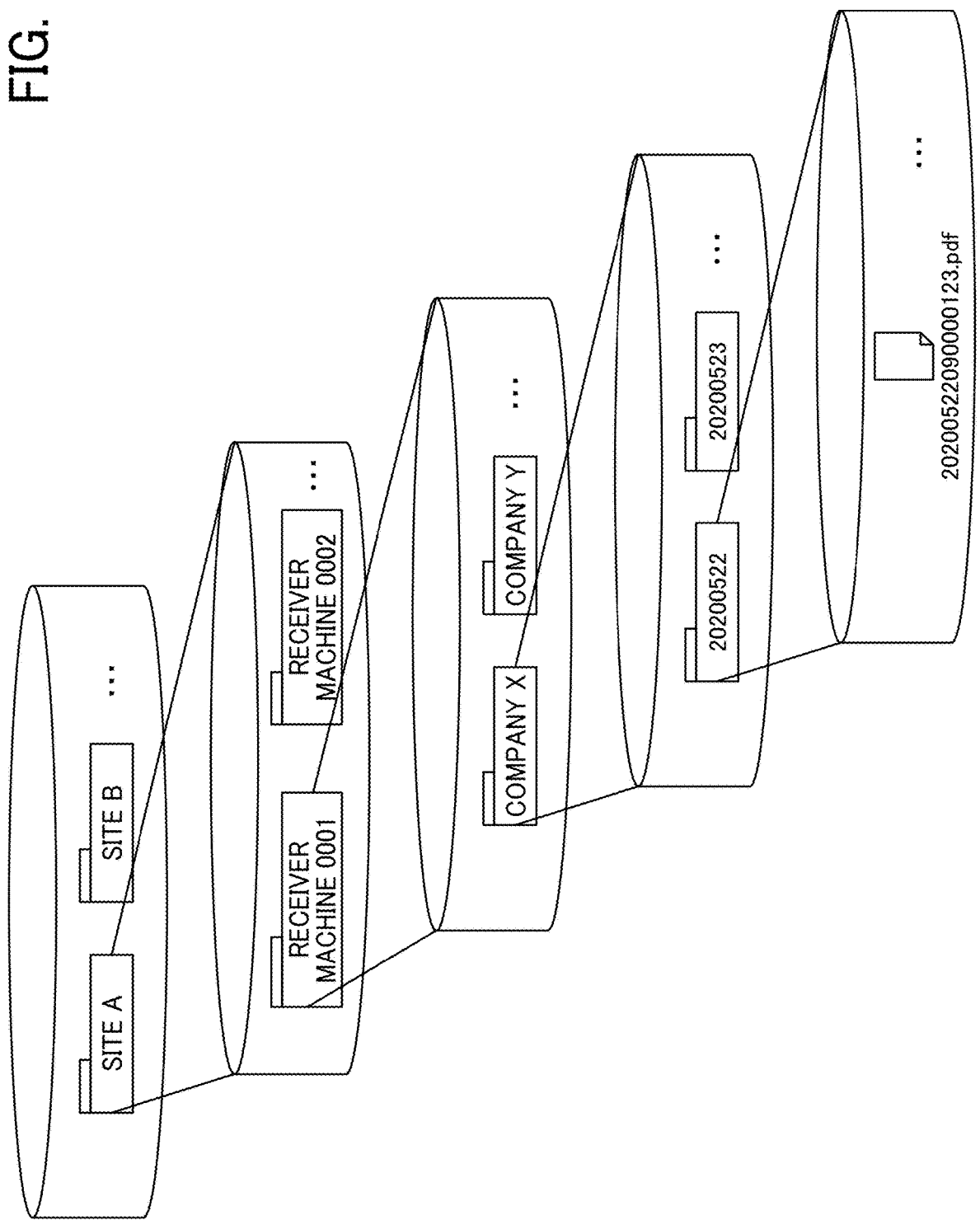
FIG. 16 illustrates an example of a folder structure created by a management system according to a variation.

The management system 1 according to a variation of the above-described embodiment creates, instead of the folder having the structure illustrated in FIG. 9, a folder having the structure illustrated in FIG. 16, and stores the image data in such a folder to manage the received facsimile data. FIG. 16 is a diagram illustrating an example of the folder structure created by the management system according to the variation.

In the folder structure illustrated in FIG. 16, receiver site name folders, receiver machine name folders, business partner name folders, and reception date and time name folders are in a hierarchical structure. The receiver site name folder includes the receiver machine name folders. The receiver machine name folder includes the business partner name folders. The business partner name folder includes reception date and time name folders. Received facsimile data is stored in the reception date and time name folder.

In the case of the folder structure illustrated in FIG. 16, the received data management unit 20 of the facsimile data management apparatus 10 can acquire the information on the facsimile machine 12 and the information on the receiver site corresponding to the receiver number of the received facsimile data using, for example, a table illustrated in FIG. 17 stored in the management information storage area 24. FIG. 17 illustrates an example of information stored in the management information storage area 24.

FIG. 17 illustrates an example of a table for associating the receiver number, the information on the receiver machine (the facsimile machine 12), and the information on the receiver site with each other. The table illustrates in FIG. 17 includes two records in which the value of the item "receiver machine" is "0003." The two records are records of different receiver numbers assigned to the same facsimile machine 12. Using the table illustrated in FIG. 17, the facsimile data management apparatus 10 identifies received facsimile data sent to different receiver numbers assigned to the same facsimile machine 12.

In the case of the management system 1 capable of identifying received facsimile data addressed to different receiver numbers assigned to the same facsimile machine 12, the management system 1 creates the folder structure, for example, illustrated in FIG. 16. Then, the management system 1 displays the list of received facsimile data classified by the tree structure of the site, the facsimile machine 12, the business partner, and the reception date and time as illustrated in FIGS. 18A and 18B.

FIGS. 18A and 18B illustrate examples of screens on the facsimile machine on the site. FIG. 18A illustrates an example of the screen displayed on the control panel 940 to allow a user to select a site. FIG. 18B is an example of the screen displayed on the control panel 940 to allow the user to select the received facsimile data to be browsed from "this machine only," "entire site," and "all sites."

In the case where "this machine only" in FIG. 18B is selected, the facsimile data addressed to the receiver number of the facsimile machine 12 that displays the screen of FIG. 18B is set as the browsing target. That is, the browsing target is each of received facsimile data that includes destination information indicating own electronic device. In addition, referring to the table of FIG. 17, the management system 1 may identify the receiver machine having the receiver number of the facsimile machine 12 displaying the screen of FIG. 18B, and sets, as the browsing target, the facsimile data received by all the receiver numbers assigned to the identified receiver machine. When "entire site" is selected in FIG. 18B, the management system 1 sets, as the browsing target, the facsimile data received by all the receiver numbers corresponding to the site having the facsimile machine 12 displaying the screen of FIG. 18B. When "all sites" is selected in FIG. 18B, the management system 1 sets, as the browsing target, the facsimile data received by all the receiver numbers belonging to all the registered sites, not only the site having the facsimile machine 12 displaying the screen of FIG. 18B.

Figures 19A, 19B, 20:
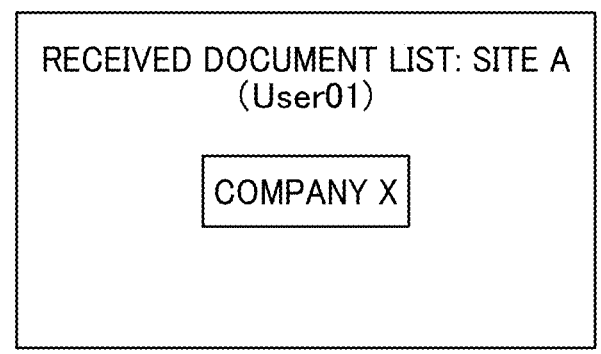
FIGS. 19A and 19B are tables as examples of information stored in a management information storage area according to another variation.
FIG. 20 illustrates an example of a screen on the facsimile machine on the site according to the variation illustrated in FIGS. 19A and 19B.

Further, the management system 1 according to the present embodiment may use tables illustrated in FIGS. 19A and 19B and, for example, stored in the management information storage area 24, to identify the site to which the user operating the facsimile machine 12 or the PC 14 belongs and the business partner handled by the user. Then, the management system 1 selects the received facsimile data to be browsed based on the site to which the identified user belongs or the business partner handled by the identified user.

In FIG. 19A, a user assigned with the user ID "User01" belongs to the site A. In the management system 1 using the tables illustrated in FIGS. 19A and 19B, for example, when the user assigned with the user ID "User01" visits the site B, the user can browse, on the facsimile machine 12 of the site B, the facsimile data received from the business partner handled by the user out of the facsimile data received by the facsimile machines 12 on the site A. In this case, the facsimile machine 12 of the site B displays, for example, a screen illustrated in FIG. 20. FIG. 20 illustrates an example of the screen on the facsimile machine on the site. The management system 1 using the tables illustrated in FIGS. 19A and 19B may change the received facsimile data to be browsed to those displayed the screens illustrated in FIGS. 21A and 21B in accordance with the user operating the facsimile machine 12. FIGS. 21A and 21B are examples of lists of received facsimile data displayed on the facsimile machine and the PC on the site. The screen illustrated in FIG. 21A displays the list of the facsimile data received by the facsimile machines 12 belonging to a plurality of sites. Such display is convenient for the user who handles the facsimile data sent to the plurality of sites.

Further, in the management system 1 according to the present embodiment, when a new facsimile machine 12 is introduced to a site, information on the new facsimile machine 12 can be registered in the table stored in the management information storage area 24, for example, in the procedure illustrated in FIG. 22.

FIG. 22 is a flowchart of an example of the automatic registration of a facsimile machine, executed by the management system according to the present embodiment. In step S120, the received data management unit 20 of the facsimile data management apparatus 10 acquires information on the receiver site (group information) corresponding to the receiver number of the received facsimile data by using, for example, the table illustrated in FIG. 10A stored in the management information storage area 24.

In step S122, the received data management unit 20 determines whether or not the information of the receiver site has been acquired in step S120. When the information of the receiver site is acquired (Yes in S122), the facsimile machine 12 is not a machine newly introduced to the site, and the received data management unit 20 ends the process of FIG. 22. On the other hand, when the information of the receiver site is not acquired (No in S122), the facsimile machine 12 is a machine newly introduced to the site. The received data management unit 20 proceeds to step S124 and acquires the global IP address of the facsimile machine 12 from a parameter of communication between the facsimile machine 12 and the facsimile data management apparatus 10. The global IP address of the facsimile machine 12 is transmitted from the facsimile machine 12 to the facsimile data management apparatus 10 as a communication parameter included, for example, in the data transmitted in step S12 in the sequence diagram of FIG. 7.

In step S126, the received data management unit 20 acquires the site information corresponding to the global IP address of the facsimile machine 12 from the table illustrated in FIG. 12. In step S128, the received data management unit 20 registers the site information acquired in step S126 in association with the receiver number, for example, as illustrated in the table of FIG. 23. FIG. 23 is an example of a table associating the receiver number with the receiver site information (e.g., site name). The receiver number of the facsimile machine newly introduced to the receiver site is registered in the table illustrated in FIG. 23.

As described above, the procedure illustrated in the flowchart of FIG. 22 obviates the work of, for example, an administrator or the like (hereinafter simply "administrator") to register the correspondence between the receiver number of the facsimile machine 12 newly introduced to the site and the information of the receiver site. According to the procedure illustrated in 22, the received data management unit 20 automatically registers the correspondence upon transmission of the received facsimile data from the facsimile machine 12 to the facsimile data management apparatus 10.

Figure 24A:
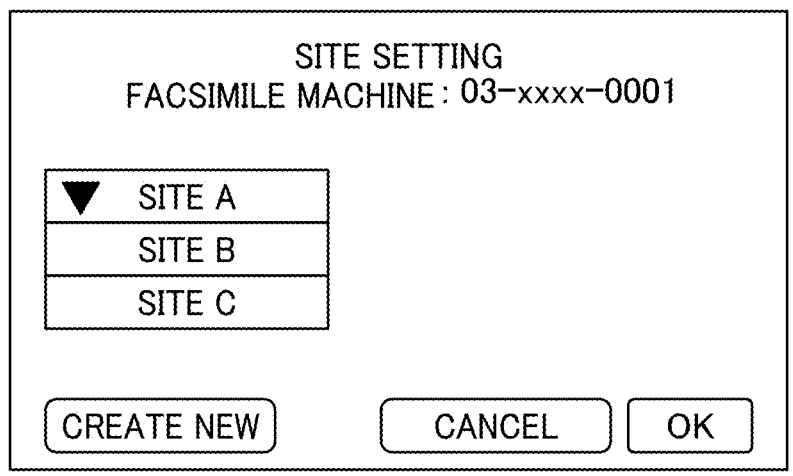
FIGS. 24A and 24B are diagrams illustrating examples of setting screens for creating and updating a table that associates a receiver number with receiver site information.
Figure 24B:
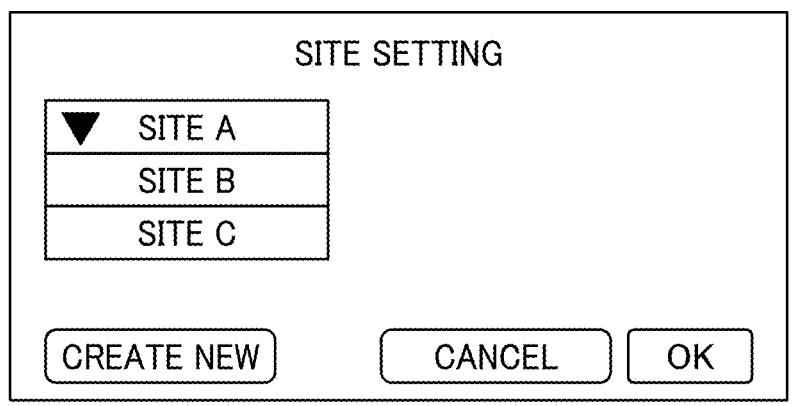

The table illustrated in FIG. 10A that associates the receiver number (terminal identification information) with the information of the receiver site is created and updated using, for example, the following setting screen. FIGS. 24A and 24B are diagrams illustrating examples of the setting screen. FIG. 24A is an example of the setting screen provided by the facsimile data management apparatus 10. FIG. 24B illustrates an example of the setting screen displayed by the facsimile machine 12.

The setting screen illustrated in FIG. 24A is provided by a web server included in the facsimile data management apparatus 10 and is displayed on a web browser on the PC 14 used by the administrator. The administrator selects the facsimile machine 12 to be set on a facsimile machine list screen. Receiving the selecting operation by the administrator, the facsimile data management apparatus 10 displays the setting screen of FIG. 24A on the web browser of the PC 14 used by the administrator.

The administrator selects the site of the facsimile machine 12 to be set from a pull-down list on the setting screen illustrated in FIG. 24A. The facsimile data management apparatus 10 displays the pull-down list using a site list table stored in the management information storage area 24. The setting screen of FIG. 24A is an example. For example, a plurality of facsimile machines 12 to be set may be selected, and a collective selection of the site of the plurality of facsimile machines 12 to be set may be received.

By a selection operation such as clicking of an "OK" button, the administrator can select the site information of the facsimile machine 12 to be set on the setting screen of FIG. 24A. The site information of the facsimile machine 12 to be set, selected by the administrator on the setting screen of FIG. 24A, is provided to the received data management unit 20. The received data management unit 20 creates and updates the table of FIG. 10A based on the provided site information of the facsimile machine 12 to be set.

The facsimile data management apparatus 10 also displays a new site information creation screen in response to a selecting operation by the administrator, such as clicking of a "create new" button on the setting screen illustrated in FIG. 24A, so as to create new site information on the create new screen. The received data management unit 20 creates and updates the table of FIG. 10A based on the created new site information. The setting screen of FIG. 24B is an example displayed on the facsimile machine 12, and the site of the facsimile machine 12 to be set is selected from the pull-down list in the same manner as in FIG. 24A.

Further, the setting screens of FIGS. 24A and 24B may be modified to receive selection of a grouping item (grouping condition) as illustrated in FIG. 25. FIG. 25 is a diagram illustrating an examples of such a setting screen. In the example illustrated in FIG. 25, the setting screen presents the grouping item options of "site," "department," and "business," and "department" is selected as the grouping item. On the setting screen illustrated in FIG. 25, the administrator can select a group to which the facsimile machine 12 to be set belongs, from the groups "department A," "department B," and "department C" based on the grouping item "department."

On the setting screen of FIG. 25, the group options are displayed using the site list table, the department list table, or the business list table corresponding to the selected grouping item. The site list table, the department list table, and the business list table are stored in the management information storage area 24. In the configuration to enable selecting of the grouping item as illustrated in FIG. 25, the table of FIG. 10A is changed to that as illustrated in FIG. 26. FIG. 26 is a table illustrating an example of information stored in the management information storage area 24. In FIG. 26, the item "receiver site" in FIG. 10A is changed to the item "receiver group." In the item "receiver group" includes the group to which the facsimile machine 12 to be set, selected on the setting screen of FIG. 25, belongs.

Figure 27A:
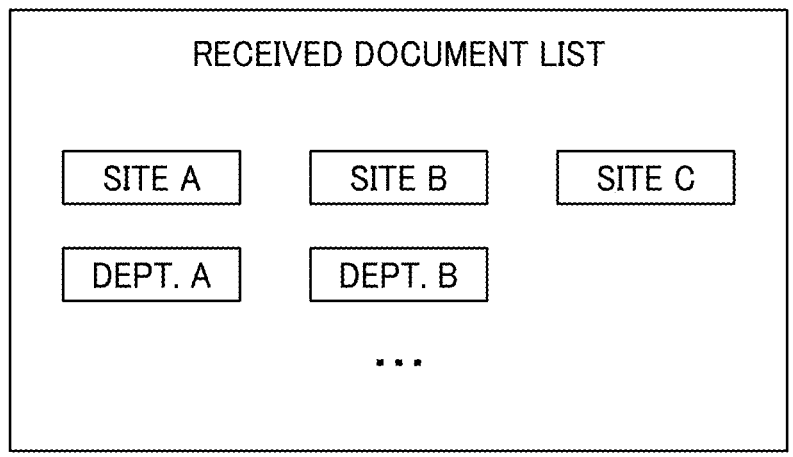
FIGS. 27A and 27B illustrate examples of screens on the facsimile machine on the site in the case illustrated in FIG. 25.
Figure 27B:
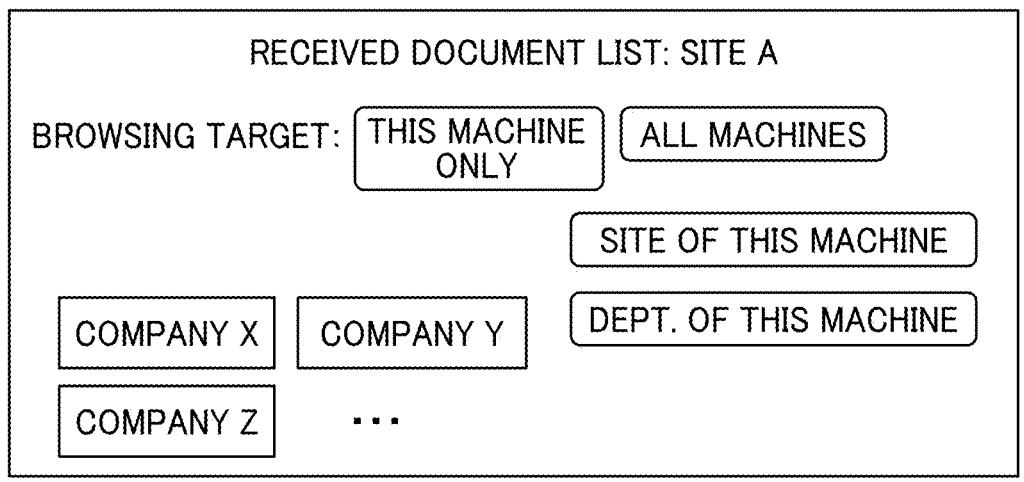

In the configuration to enable selecting of the grouping item as illustrated in FIG. 25, the screen of FIGS. 18A and 18B are changed to those illustrated in FIGS. 27A and 27B. FIGS. 27A and 27B illustrate examples of the screen on the facsimile machine on the site. FIG. 27A illustrates an example of the screen for selecting a site, displayed on the control panel 940. FIG. 27B is an example of a screen displayed on the control panel 940 to allow the user to select the range of the received facsimile data to be browsed from "this machine only," "all machines," "site of this machine," and "department of this machine."

In the examples illustrated in FIGS. 26 to 27B, when the facsimile machine 12 having the receiver number "03-xxxx-0001" receives an operation, by the administrator, of selecting the "site of this machine" button, the facsimile machine 12 displays a list of the facsimile data received by itself and the facsimile machine 12 having the receiver number "03-xxxx-0002."

In the example illustrated in FIGS. 26 to 27B, when the facsimile machine 12 having the receiver number "03-xxxx-0001" receives an operation, by the administrator, of selecting the "department of this machine" button, the facsimile machine 12 displays a list of the facsimile data received by itself (i.e., own electronic device), the facsimile machine 12 having the receiver number "06-xxxx-0003," and the facsimile machine 12 having the receiver number "06-xxxx-0006," which belong to the "department B."

An aspect of the disclosure provides a method for managing facsimile data received by each of a plurality of electronic devices. The method includes storing, in a memory, the received facsimile data in association with information on a group to which a destination of the received facsimile data belongs. The destination is one of the plurality of electronic devices. The method further includes transmitting a list of the received facsimile data based on a browse request of the received facsimile data. In the list, the received facsimile data is classified according to at least the information on the group to which the destination belongs.

The description above concerns an example in which the facsimile data management apparatus 10 identifies the site of the facsimile machine 12. Alternatively, the present embodiment may be modified such that the facsimile machine 12 identifies the site. In this case, the facsimile machine 12 tries acquiring the site information to which the facsimile machine 12 belongs from another machine capable of data communication, to determine whether the site information to which the facsimile machine 12 belongs has been registered. In the present embodiment, the description above concerns an example in which the facsimile machine 12 transfers the received facsimile data to the facsimile data management apparatus 10. However, aspects of the present embodiment are also applicable to a system in which a facsimile reception server temporarily stores the received facsimile data and transmits the received facsimile data based on a request from the facsimile machine 12. In such a system, the fax reception server may transfer the received facsimile data to the facsimile data management apparatus 10, or the facsimile reception server may execute the function of the facsimile data management apparatus 10.

Each of the functions of the described embodiments may be implemented by one or more processing circuits or circuitry. Here, the "processing circuit or circuitry" in the present specification includes a programmed processor to execute each function by software, such as a processor implemented by an electronic circuit, and devices, such as an application specific integrated circuit (ASIC), a digital signal processors (DSP), a field programmable gate array (FPGA), and conventional circuit modules designed to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The apparatuses or devices described in the above embodiments and variations are just one example of plural computing environments that implement the embodiments disclosed herein. The received data management unit 20 is an example of a received facsimile data management unit. The list response unit 22 is an example of a list response unit. The facsimile communication control unit 30 is an example of a facsimile communication control unit. The received data transfer unit 32 is an example of a facsimile data transfer unit. The received data browse request unit 34 is an example of a received facsimile data browse request unit. The screen control unit 36 is an example of a display control unit.

Although, in the above-described embodiments, the management apparatus and management system manage facsimile data received by a plurality of electronics devices, the management apparatus and the management system may manage facsimile data received by a single electronics device from a plurality of electronics devices having facsimile capability.

Any one of the above-described operations may be performed in various other ways, for example, in an order different from the one described above.

The invention claimed is:

1. A management apparatus, comprising:
circuitry configured to:
store, in a memory, facsimile data received by an electronic device in association, with information on a group to which the electronic device belongs;
in response to a browse request of the facsimile data, identify a group to which a source of the browse request belongs, based on information of the source of the browse request and association information associating the electronic device with information on the group to which the electronic device belongs; and
transmit a list corresponding to the identified group, the list in which the facsimile data is classified according to the information on the group to which the electronic device belongs and at least one of sender information of the facsimile data and receiver information of the facsimile data.

2. The management apparatus according to claim 1, wherein the circuitry is further configured to:
store, in the memory, each of the facsimile data in association with information on a group to which a sender number included in the facsimile data belongs; and
transmit the list of the facsimile data, the list in which the facsimile data is classified at least according to the group to which the sender number belongs.

3. The management apparatus according to claim 1, wherein in a case where the browse request includes user information, the circuitry is further configured to transmit the list of the facsimile data associated with information on a group corresponding to the user information, the list in which the facsimile data is classified based on at least the user information.

4. The management apparatus according to claim 1, wherein the processing circuitry is further configured to register, based on a user operation, the electronic device in association with information on the group to which the electronic device belongs.

5. The management apparatus according to claim 1, wherein
the electronic device is one of a plurality of electronic devices connected via a network to the management apparatus, and
the circuitry is further configured to group two or more of the plurality of electronic devices based on at least one of:
information on a site where the electronic device is installed;
information on a location of the electronic device; and
information on an organization, a department, or a task that uses the electronic device.

6. A management system, comprising:
the management apparatus according to claim 1; and
a plurality of electronic devices including the electronic device, wherein
the management apparatus is connected via a network to the plurality of electronic devices to perform data communication, and
each of the plurality of electronic devices includes first circuitry configured to:
transmit and receive facsimile data; and
transfer the facsimile data to the management apparatus.

7. The management system according to claim 6, wherein the first circuitry of each of the plurality of electronic devices is further configured to:
transmit the browse request to the management apparatus; and
display, on a display, the list of the facsimile data transmitted from the management apparatus.

8. The management system according to claim 7, wherein the first circuitry is configured to display, on the display, the list of the facsimile data transmitted from the management apparatus, and receive an operation of switching of display between:
a first list of the facsimile data including receiver information indicating a particular electronic device of the plurality of electronic devices receiving the operation of switching;
a second list of the facsimile data associated with information on a group to which the particular electronic device belongs; and
a third list of the facsimile data associated with information on any registered group.

9. The management system according to claim 6, wherein the browse request includes user information, and
the first circuitry is further configured to:
receive the list of the facsimile data associated with information on a group corresponding to the user information included in the browse request, the list being classified based on at least the user information; and
display the list on the display.

10. A management apparatus, comprising:
circuitry configured to:
store, in a memory, facsimile data received by an electronic device in association with information on a group to which the electronic device belongs;
transmit, in response to a browse request of the facsimile data, a list in which the facsimile data is classified according to at least the information on the group to which the electronic device belongs; and
in a case that the information on the group to which the electronic device belongs is not identified,
identify site information corresponding to a global internet protocol address of the electronic device; and
store, in the memory, the facsimile data in association with the identified site information as the information on the group to which the electronic device belongs.

11. A non-transitory recording medium storing computer executable instructions which, when executed by one or more processors, cause the one or more processors to perform a process comprising:
store facsimile data received by an electronic device in association with information on a group to which the electronic device belongs;
, in response to a browse request of the facsimile data, identify a group to which a source of the browse request belongs, based on information of the source of the browse request and association information associating the electronic device with information on the group to which the electronic device belongs; and
transmit a list corresponding to the identified group, the list in which the facsimile data is classified according to the information on the group to which the electronic device belongs and at least one of sender information of the facsimile data and receiver information of the facsimile data.

\* \* \* \* \*